(12) United States Patent
Chen et al.

(10) Patent No.: US 12,375,420 B2
(45) Date of Patent: *Jul. 29, 2025

(54) DYNAMICALLY RE-ALLOCATING COMPUTING RESOURCES WHILE MAINTAINING NETWORK CONNECTION(S)

(71) Applicant: Microsoft Technology Licensing, LLC, Redmond, WA (US)

(72) Inventors: Ken Chen, Shanghai (CN); Chenyang Liu, Shanghai (CN); Dayang Shen, Shanghai (CN); Liangying Wei, Shanghai (CN); Zhenghui Yan, Shanghai (CN); David M. Fowler, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,178

(22) Filed: Mar. 11, 2024

(65) Prior Publication Data

US 2024/0214326 A1 Jun. 27, 2024

Related U.S. Application Data

(63) Continuation of application No. 17/967,741, filed on Oct. 17, 2022, now Pat. No. 11,962,512, which is a
(Continued)

(51) Int. Cl.
*H04L 47/762* (2022.01)
*H04L 47/78* (2022.01)
*H04L 47/80* (2022.01)

(52) U.S. Cl.
CPC .......... *H04L 47/762* (2013.01); *H04L 47/781* (2013.01); *H04L 47/803* (2013.01); *H04L 47/805* (2013.01)

(58) Field of Classification Search
CPC ... H04L 47/762; H04L 47/781; H04L 47/803; H04L 47/805
(Continued)

(56) References Cited

U.S. PATENT DOCUMENTS

| 7,673,113 | B2 * | 3/2010 | Sugumar | G06F 9/45558 |
| | | | | 711/170 |
| 10,680,969 | B1 * | 6/2020 | Quinn | G06F 9/45558 |

(Continued)

FOREIGN PATENT DOCUMENTS

| CN | 103890714 A | * | 6/2014 | ......... G06F 9/45558 |
| CN | 104123189 A | * | 10/2014 | |

(Continued)

*Primary Examiner* — Ruolei Zong
(74) *Attorney, Agent, or Firm* — Wade IP Law PLLC

(57) ABSTRACT

Techniques are described herein that are capable of dynamically re-allocating computing resources while maintaining network connection(s). Applications of users are run in a computing unit. Computing resources are allocated among the applications based at least in part on dynamic demands of the applications for the computing resources and resource limits associated with the respective customers. In a first example, the computing resources are dynamically re-allocated among the applications, as a result of changing the resource limit of at least one customer, while maintaining at least one network connection between a client device of each customer and at least one respective application. In a second example, the computing resources are dynamically re-allocated among the applications, as a result of changing the resource limit of at least one customer, while maintaining at least one network connection between an interface and a client device of each customer.

20 Claims, 9 Drawing Sheets

Related U.S. Application Data continuation of application No. 17/531,666, filed on Nov. 19, 2021, now Pat. No. 11,509,598.

(58) Field of Classification Search
USPC .......................................................... 709/226
See application file for complete search history.

(56) References Cited

U.S. PATENT DOCUMENTS

| | | | | |
|---|---|---|---|---|
| 2014/0237111 A1* | 8/2014 | McMurry | ............. | G06F 9/5072 |
| | | | | 709/224 |
| 2016/0330083 A1* | 11/2016 | Djukic | ................ | H04L 12/1492 |
| 2017/0206027 A1* | 7/2017 | Nakajima | ............. | G06F 3/0617 |
| 2019/0278624 A1* | 9/2019 | Bade | ..................... | G06F 9/4856 |

FOREIGN PATENT DOCUMENTS

| | | | | | |
|---|---|---|---|---|---|
| EP | 1412857 | B1 * | 7/2007 | ............. | G06F 9/505 |
| JP | 2009265894 | A * | 11/2009 | | |

* cited by examiner

DYNAMICALLY RE-ALLOCATING COMPUTING RESOURCES WHILE MAINTAINING NETWORK CONNECTION(S)

CROSS-REFERENCE TO RELATED APPLICATION(S)

This application is a continuation of U.S. patent application Ser. No. 17/967,741, filed Oct. 17, 2022 and entitled "Dynamically Re-Allocating Computing Resources While Maintaining Network Connection(s)," which is a continuation of U.S. patent application Ser. No. 17/531,666, filed Nov. 19, 2021 and entitled "Dynamically Re-Allocating Computing Resources While Maintaining Network Connection(s)," the entireties of which are incorporated herein by reference.

BACKGROUND

A multi-tenant software service is a software service that provides computing resources to multiple customers (e.g., to applications of the customers). For instance, the applications of the customers may share the computing resources. Multi-tenant software services traditionally use Kubernetes to orchestrate containers, which manage use of the resources by the applications. The containers that are orchestrated by Kubernetes are referred to collectively as a pod. When the containers in the pod are unable to handle the workload of the applications (i.e., the applications' use of the resources), another container may be added to the pod to share a portion of the workload.

Each customer typically is allowed to use a certain amount of the resources, and the amount is pre-provisioned, meaning that the amount is reserved for the customer even if the customer does not use the amount. Pre-provisioning may result in inefficient utilization of the resources and a higher likelihood that additional containers are added to the pod that services the customer.

The amount of the resources that a customer is allowed to use may be changed (e.g., increased or decreased). However, changing this amount traditionally causes the containers that service the customer to be terminated, which causes network connections to the applications of the customer to be terminated.

SUMMARY

Various approaches are described herein for, among other things, dynamically re-allocating computing resources while maintaining network connection(s). For instance, the computing resources may be re-allocated in real-time and/or on-the-fly. A network connection is a connection between computing systems via a network. For instance, the network connection may be between a client device and a server (e.g., an interface of the server or an application that runs on the server). A computing resource includes a processor (e.g., central processing unit) and/or a memory. The computing resource may be physical or virtual. For instance, a computing resource may include a physical processor, a virtual processor, a physical memory, and/or a virtual memory. A computing resource may be accessible via a network. For instance, the computing resource may be provided by a server and accessed by a client device via the network. A maximum amount of the computing resources that a customer is allowed to use is referred to as a "resource limit" of the customer. The computing resources may be allocated among applications of customers in accordance with the resource limits that are established for the respective customers. Accordingly, the amount of the computing resources that is allocated to a customer cannot exceed the resource limit that is established for the customer. When the resource limit of any one or more of the customers is changed, the computing resources can be dynamically re-allocated among the applications while maintaining at least one network connection for each customer whose resource limit has changed.

In an example approach, applications of customers of a multi-tenant software service are run (e.g., executed) in a common computing unit using one or more processes that are included in the common computing unit. The common computing unit is a virtual machine or a container. Computing resources are allocated among the applications within the common computing unit based at least in part on dynamic demands of the applications for the computing resources and further based at least in part on resource limits associated with the respective customers.

In a first aspect of this approach, the computing resources are dynamically re-allocated among the applications within the common computing unit, as a result of changing the resource limit of at least one customer, while maintaining at least one network connection between a client device of each customer and at least one respective application.

In a second aspect of this approach, the computing resources are dynamically re-allocated among the applications within the common computing unit, as a result of changing the resource limit of at least one customer, while maintaining at least one network connection between an interface, which is between client devices of the customers and the applications, and a client device of each customer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
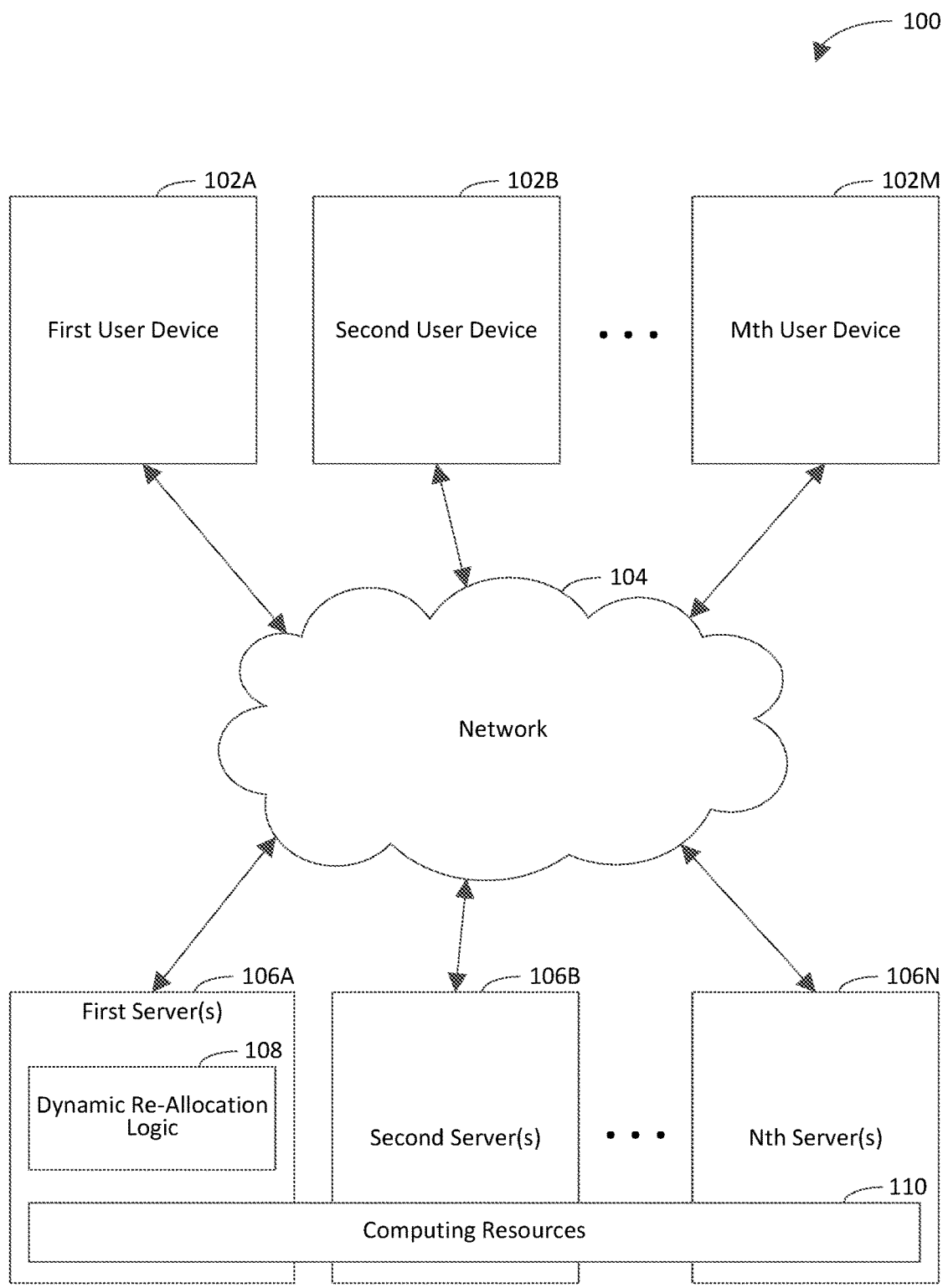
FIG. 1 is a block diagram of an example dynamic re-allocation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", and "third" are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of dynamically re-allocating computing resources while maintaining network connection(s). For instance, the computing resources may be re-allocated in real-time and/or on-the-fly. A network connection is a connection between computing systems via a network. For instance, the network connection may be between a client device and a server (e.g., an interface of the server or an application that runs on the server). A computing resource includes a processor (e.g., central processing unit) and/or a memory. The computing resource may be physical or virtual. For instance, a computing resource may include a physical processor, a virtual processor, a physical memory, and/or a virtual memory. A computing resource may be accessible via a network. For instance, the computing resource may be provided by a server and accessed by a client device via the network. A maximum amount of the computing resources that a customer is allowed to use is referred to as a "resource limit" of the customer. The computing resources may be allocated among applications of customers in accordance with the resource limits that are established for the respective customers. Accordingly, the amount of the computing resources that is allocated to a customer cannot exceed the resource limit that is established for the customer. When the resource limit of any one or more of the customers is changed, the computing resources can be dynamically re-allocated among the applications while maintaining at least one network connection for each customer whose resource limit has changed.

Example techniques described herein have a variety of benefits as compared to conventional techniques for re-allocating computing resources. For instance, the example techniques may be capable of increasing resource sharing efficiency, elasticity, scalability, and/or stability of a multi-tenant software service. For instance, allocating resources for a group of applications together may increase the efficiency of sharing the resources within the group. The multi-tenant software service may quickly scale to meet customers' demands without sacrificing its stability. Accordingly, the example techniques may increase efficiency and/or stability of a computing system that executes the multi-tenant software service. The example techniques may enable multiple applications to be scaled together. The applications may share resources with other applications within a common computing unit without a need to scale (e.g., add) new computing unit(s). By reducing a likelihood that computing units will be added or removed, the stability of the multi-tenant software service and the computing system that executes the multi-tenant software service may be increased.

In accordance with the example techniques, computing resources need not necessarily be pre-provisioned to customers. The example techniques may therefore enable the applications to utilize the resources more efficiently, as compared to conventional techniques. A resource limit of a customer may be changed without terminating virtual machine(s) and/or container(s) that service the customer. The virtual machine(s) and/or container(s) may include process(es) that run application(s) of the customer, and the resource limit of the customer may be changed without terminating those process(es). Accordingly, connection(s) between a client device(s) of the customer and the application(s) of the customer (or an interface that is connected between the client device(s) and the application(s)) may be maintained while the resources are re-allocated to accommodate the change to the resource limit.

The example techniques may reduce an amount of time and/or resources (e.g., processor cycles, memory, network bandwidth) that is consumed to re-allocate computing resources among applications (e.g., as a result of a resource limit of at least one customer being changed). For instance, by maintaining at least one network connection between a client device of each customer and at least one respective application, a computing system may conserve the time and resources that would have been consumed by the computing system to re-establish such connections in response to the connections being terminated. By reducing the amount of time and/or resources that is consumed, the example techniques may increase an efficiency of the computing system that re-allocates the computing resources.

By maintaining at least one network connection between a client device of each customer and at least one respective application, the example techniques may improve (e.g., increase) a user experience of the customers and/or increase efficiency of the customers. The example techniques may reduce a cost of re-allocating computing resources by eliminating a need to re-establish connections that would have otherwise been terminated as a result of changing a resource limit of any one or more of the customers. For instance, a cost associated with re-establishing the connections may be avoided. The example techniques may increase stability of a computing system that re-allocates the computing resources by reducing a likelihood that connections of the customers will be terminated as a result of the re-allocation.

FIG. 1 is a block diagram of an example dynamic re-allocation system 100 in accordance with an embodiment. Generally speaking, the dynamic re-allocation system 100 operates to provide information to users in response to requests (e.g., hypertext transfer protocol (HTTP) requests) that are received from the users. The information may include documents (e.g., Web pages, images, audio files, and video files), output of executables, and/or any other suitable type of information. In accordance with example embodiments described herein, the dynamic re-allocation system 100 dynamically re-allocating computing resources while maintaining network connection(s). Detail regarding techniques for dynamically re-allocating computing resources while maintaining network connection(s) is provided in the following discussion.

As shown in FIG. 1, the dynamic re-allocation system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer or a personal digital assistant. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (e.g., Web pages, images, audio files, and video files), output of executables, or any other suitable type of information. In accordance with some example embodiments, the servers 106A-106N are configured to host respective Web sites, so that the Web sites are accessible to users of the dynamic re-allocation system 100.

One example type of computer program that may be executed by one or more of the servers 106A-106N is a multi-tenant software service. For instance, the multi-tenant software service may be configured to provide computing resources 110 to customers at the user devices 102A-102M. It will be recognized that the example techniques described herein may be implemented using a multi-tenant software service.

The first server(s) 106A are shown to include dynamic re-allocation logic 108 for illustrative purposes. The dynamic re-allocation logic 108 is configured to dynamically re-allocate computing resources 110 among the servers 106A-106N while maintaining network connection(s). Each of the computing resources 110 includes a processor (e.g., virtual processor) and/or a memory (e.g., virtual memory). The computing resources 110 are shown in FIG. 1 to be distributes across the servers 106A-106N for illustrative purposes. It will be recognized that any one or more of the computing resources 110 may be included in (e.g., hosted by) any one or more of the servers 106A-106N.

In an example implementation, the dynamic re-allocation logic 108 runs applications of customers of a multi-tenant software service in a common computing unit using one or more processes that are included in the common computing unit. The common computing unit is a virtual machine or a container. The dynamic re-allocation logic 108 allocates the computing resources 110 among the applications within the common computing unit based at least in part on dynamic demands of the applications for the computing resources 110 and further based at least in part on resource limits associated with the respective customers. Each resource limit indicates a maximum amount of the computing resources 110 that is capable of being allocated to the respective customer.

In a first aspect of this implementation, the dynamic re-allocation logic 108 dynamically re-allocates the computing resources 110 among the applications within the common computing unit, as a result of changing the resource limit of at least one customer, while maintaining at least one network connection between a client device (e.g., any of client devices 102A-102M) of each customer and at least one respective application.

In a second aspect of this implementation, the dynamic re-allocation logic 108 dynamically re-allocates the computing resources 110 among the applications within the common computing unit, as a result of changing the resource limit of at least one customer, while maintaining at least one network connection between a client device (e.g., any of client devices 102A-102M) of each customer and an interface, which is coupled between the client devices 102A-102M and the applications.

The dynamic re-allocation logic 108 may be implemented in various ways to dynamically re-allocate the computing resources 110 while maintaining network connection(s), including being implemented in hardware, software, firmware, or any combination thereof. For example, the dynamic re-allocation logic 108 may be implemented as computer program code configured to be executed in a processing system (e.g., one or more processors). In another example, at least a portion of the dynamic re-allocation logic 108 may be implemented as hardware logic/electrical circuitry. For instance, at least a portion of the dynamic re-allocation logic 108 may be implemented in a field-programmable gate array (FPGA), an application-specific integrated circuit (ASIC), an application-specific standard product (ASSP), a system-on-a-chip system (SoC), or a complex programmable logic device (CPLD). Each SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

The dynamic re-allocation logic 108 may be partially or entirely incorporated in a multi-tenant software service, though the example embodiments are not limited in this respect.

The dynamic re-allocation logic 108 is shown to be incorporated in the first server(s) 106A for illustrative purposes and is not intended to be limiting. It will be recognized that the dynamic re-allocation logic 108 (or any portion(s) thereof) may be incorporated in any one or more of the user devices 102A-102M. For example, client-side aspects of the dynamic re-allocation logic 108 may be incorporated in one or more of the user devices 102A-102M, and server-side aspects of dynamic re-allocation logic 108 may be incorporated in the first server(s) 106A. In another example, the dynamic re-allocation logic 108 may be distributed among the user devices 102A-102M. In yet another example, the dynamic re-allocation logic 108 may be incorporated in a single one of the user devices 102A-102M. In another example, the dynamic re-allocation logic 108 may be distributed among the server(s) 106A-106N. In still another example, the dynamic re-allocation logic 108 may be incorporated in a single one of the servers 106A-106N.

Figure 2:
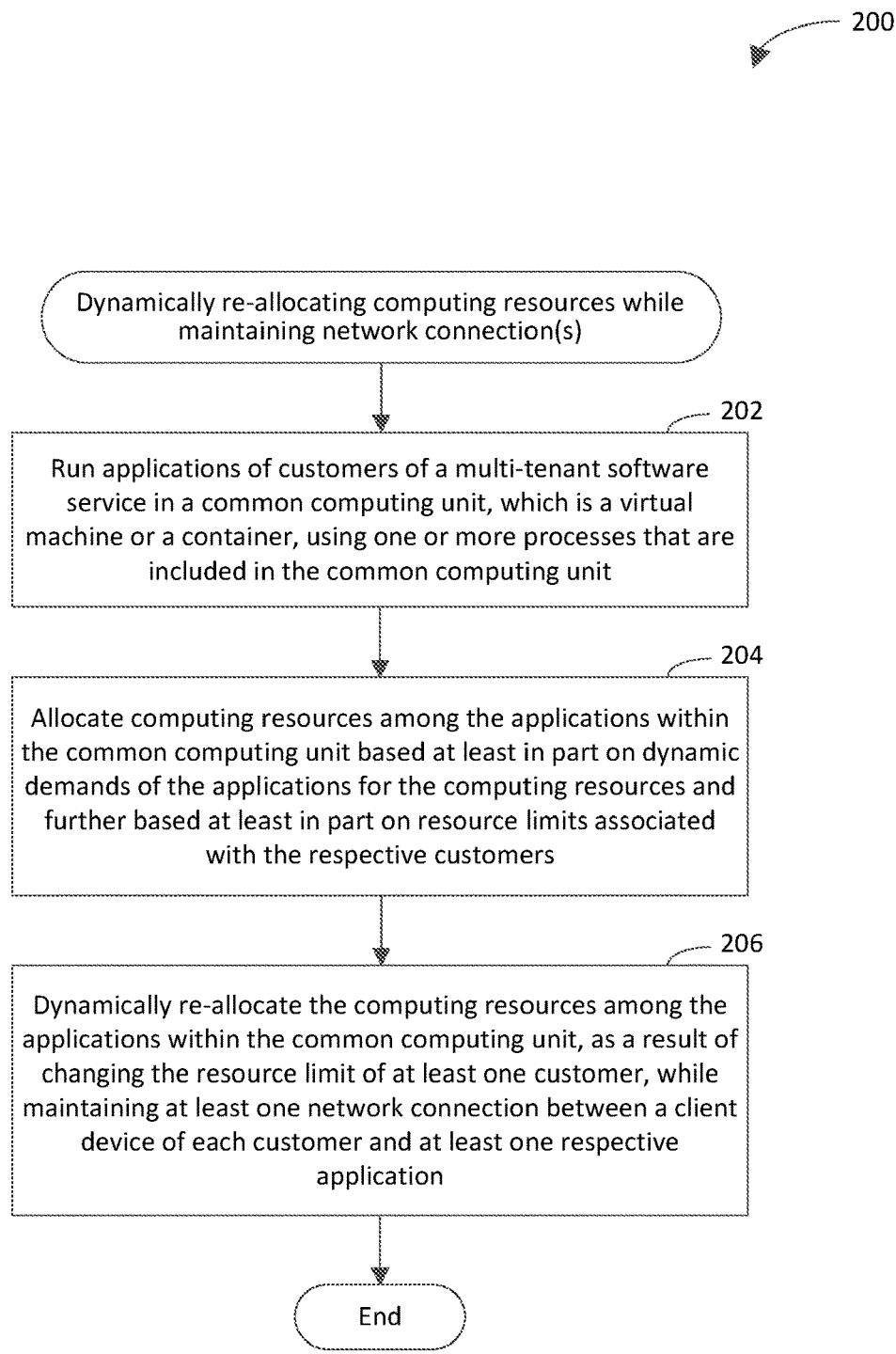
FIGS. 2 and 4 depict flowcharts of example methods for dynamically re-allocating computing resources while maintaining network connection(s) in accordance with embodiments.
Figure 3:
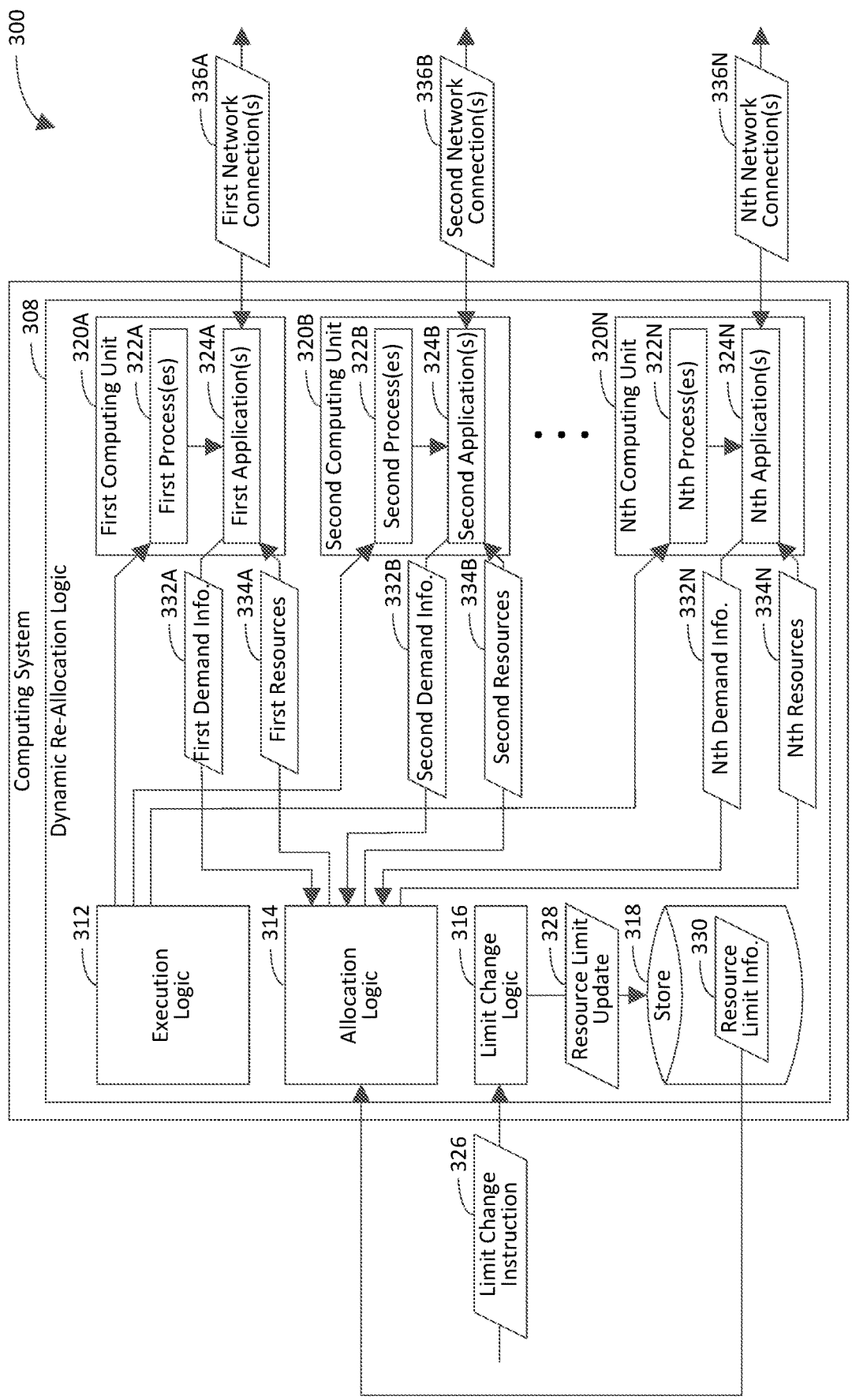
FIGS. 3 and 5 are block diagrams of example computing systems in accordance with embodiments.

FIG. 2 depicts a flowchart 200 of an example method for dynamically re-allocating computing resources while maintaining network connection(s) in accordance with an embodiment. Flowchart 200 may be performed by the first server(s) 106A, shown in FIG. 1, for example. For illustrative purposes, flowchart 200 is described with respect to a computing system 300 shown in FIG. 3, which is an example implementation of the first server(s) 106A. As shown in FIG. 3, the computing system 300 includes dynamic re-allocation logic 308. The dynamic re-allocation logic 308 includes execution logic 312, allocation logic 314, limit change logic 316, a store 318, and a plurality of computing units 320A-320N. The store 318 may be any suitable type of store. One suitable type of store is a database. For instance, the store 318 may be a relational database, an entity-relationship database, an object database, an object relational database, or an extensible markup language (XML) database. The store 318 is shown to store resource limit information 330 for illustrative purposes. The plurality of computing units 320A-320N includes a plurality of respective processes 322A-322N and a plurality of respective applications 324A-324N. For instance, the first computing unit 320A includes first process(es) 322A and first application(s) 324A; the second computing unit 320B includes second process(es) 322B and second application(s) 324B, and so on. Each of the computing units 320A-320N is a virtual machine or a container. Any two or more of the computing units 320A-320N may be included in a common Kubernetes pod, though the example embodiments are not limited in this respect. Further structural and operational embodiments will be apparent to persons skilled in the relevant art(s) based on the discussion regarding flowchart 200.

As shown in FIG. 2, the method of flowchart 200 begins at step 202. In step 202, applications of customers of a multi-tenant software service are run in a common computing unit using one or more processes that are included in the common computing unit. The common computing unit is a virtual machine or a container. In an example implementation, the execution logic 312 runs the first application(s) 324A of the customers in the first computing unit 320A using the first process(es) 322A, which are included in the first computing unit 320A. For example, the execution logic 312 may control the first process(es) 322A to run the first application(s) 324A. In accordance with this example, the execution logic 312 may provide instructions to the first process(es) 322A that cause the first process(es) 322A to run the first application(s) 324A.

At step 204, computing resources are allocated among the applications within the common computing unit based at least in part on dynamic demands of the applications for the computing resources and further based at least in part on resource limits associated with the respective customers. Each computing resource includes a processor and/or a memory. Each resource limit indicates a maximum amount of the computing resources that is capable of being allocated to the respective customer. In an example implementation, allocation logic 314 allocates first resources 334A among the first application(s) 324A within the first computing unit 320A based at least in part on first demand information 332A, which indicates the dynamic demands of the first application(s) 324A for the first resources 334A, and further based at least in part on the resource limit information 330, which indicates the resource limits associated with the respective customers. For instance, a resource limit of a customer being relatively high may weigh in favor of allocating a greater portion of the first resources 334A to application(s) of the customer, whereas a resource limit of a customer being relatively low may weigh in favor of allocating a lesser portion of the first resources 334A to application(s) of the customer. An application having a relatively high demand for one or more resources from the first resources 334A may weight in favor of allocating a greater portion of the one or more resources to the application, whereas an application having a relatively low demand for one or more resources from the first resources 334A may weight in favor of allocating a lesser portion of the one or more resources to the application. By weighting these factors, the allocation logic 314 may determine how much of each resource from the first resources 334A to allocate to each of the first application(s) 324A.

It should be noted that the applications 324A-324N are capable of generating respective demand information 332A-332N to indicate the dynamic demands of the respective applications 324A-324N for the computing resources, and the allocation logic 314 is capable of allocating resources 334A-334N to the respective computing units 320A-320N based at least in part on the respective demand information 332A-332N and further based at least in part on the resource limits associated with the respective customers. For instance, the allocation logic 314 may allocate first resources 334A to the first application(s) 324A based at least in part on the first demand information 332A and the resource limits; the allocation logic 314 may allocate second resources 334B to the second application(s) 324B based at least in part on the second demand information 332B and the resource limits, and so on. Allocation of resources to applications in computing units other than the first computing unit 320A are discussed in greater detail below. It will be recognized that allocation of resources to the applications in the other computing units may be performed in a manner similar to the allocation of the first resources 334A to the first application(s) 324A described above.

In an example embodiment, allocating the computing resources at step 204 is performed using one or more controllers that are included in the common computing unit. For example, the first computing unit 320A may further include the one or more controllers. In accordance with this example, the allocation logic 314 may control the one or more controllers to allocate first resources 334A among the first application(s) 324A. For instance, the allocation logic 314 may provide instructions to the one or more controllers that cause the one or more controllers to allocate the first resources 334A among the first application(s) 324A.

At step 206, the computing resources are dynamically re-allocated among the applications within the common computing unit, as a result of changing the resource limit of at least one customer, while maintaining at least one network connection between a client device of each customer and at least one respective application. For instance, the computing resources may be dynamically re-allocated without a need to utilize one or more additional computing units to run at least a portion of the applications. Maintaining a network connection between a client device and an application may include maintaining an ability of the client device to use the application over the network connection from a time instance prior to initiating the dynamic re-allocation of the computing resources until a time instance after completion of the dynamic re-allocation of the computing resources. The computing resources may be dynamically re-allocated without restarting and/or ending any of the one or more processes that are used to run the applications.

In an example embodiment, dynamically re-allocating the computing resources at step 206 may include minimizing disruption of existing network connections of the customers. For instance, it may be a goal to maintain as many of the network connections as possible. Accordingly, the computing resources may be dynamically re-allocated without terminating any of the network connections.

In another example embodiment, the common computing unit is a virtual machine. In accordance with this embodiment, dynamically re-allocating the computing resources among the applications within the common computing unit at step 206 is performed without utilizing a container orchestration system (e.g., Kubernetes).

In yet another example embodiment, dynamically re-allocating the computing resources among the applications within the common computing unit at step 206 is based at least in part on the dynamic demands of the applications for the computing resources and further based at least in part on the resource limits associated with the respective customers. In accordance with this embodiment, the resource limits include the changed resource limit of the at least one customer.

In an example implementation, the allocation logic 314 dynamically re-allocates the first resources 334A among the first application(s) 324A within the first computing unit 320A, as a result of the resource limit of at least one customer changing, while maintaining at least one network connection between a client device of each customer and at least one respective application. For instance, the limit change logic 316 may receive a limit change instruction 326, instructing the limit change logic 316 to change the resource limit of at least one customer. The limit change instruction 326 may indicate each customer whose resource limit is to change and the updated resource limit that is to replace the current resource limit for the respective customer. The limit change logic 316 may generate resource limit update 328, which updates the resource limit of the at least one customer in the resource limit information 330, as instructed by the limit change instruction 326. For instance, if the limit change instruction 326 instructs the limit change logic 316 to change the resource limit of a first customer to a first updated resource limit, the limit change logic 316 updates the resource limit information 330 to include the first updated resource limit for the first customer. If the limit change instruction 326 instructs the limit change logic 316 to change the resource limit of a second customer to a second updated resource limit, the limit change logic 316 updates the resource limit information 330 to include the second updated resource limit for the second customer, and so on.

It should be noted that, in response to the resource limit of at least one customer changing, the allocation logic 314 is capable of dynamically re-allocating the resources 334A-334N among the respective applications 324A-324N within the respective computing units 320A-320N while maintaining at least one of the network connections 336A-336N, which have been established between the client devices of the customers and the applications 324A-324N, for each customer for each of the computing units 320A-320N. For instance, the allocation logic 314 may dynamically re-allocate the first resources 334A among the first application(s) 324A within the first computing unit 320A while maintaining at least one of the first network connection(s) 336A for each customer who has at least one application among the first application(s) 324A. The allocation logic 314 may dynamically re-allocate the second resources 334B among the second application(s) 324B within the second computing unit 320B while maintaining at least one of the second network connection(s) 336B for each customer who has at least one application among the second application(s) 324B, and so on.

In an example embodiment, allocating the computing resources at step 204 and/or re-allocating the computing resources at step 206 may be based at least in part on an amount that each customer pays for use of the multi-tenant software service. For example, a customer paying a relatively higher price to use the multi-tenant software service may weigh in favor of allocating a relatively greater portion of the computing resources to the customer, whereas a customer paying a relatively lower price to use the multi-tenant software service may weigh in favor of allocating a relatively lesser portion of the computing resources to the customer. For instance, a customer who pays a first amount (e.g., for 100 computing units) may be allocated a larger portion of the computing resources than another customer who pays a second amount (e.g., for 10 computing units) that is less than the first amount.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes dynamically launching a second computing unit, including one or more second applications, based at least in part on a cumulative demand and further based at least in part on the resource limits associated with the respective customers. The cumulative demand is a sum of the dynamic demands of the applications for the computing resources. For example, the allocation logic 314 may dynamically launch the second computing unit 320B, including the second application(s) 324B, based at least in part on the cumulative demand and further based at least in part on the resource limits associated with the respective customers. In accordance with this example, the cumulative demand may be a sum of the dynamic demands of the first application(s) 324A for the first resources 334A, as indicated by the first demand information 332A. In further accordance with this example, the allocation logic 314 may analyze the resource limit information 330 to determine the resource limits associated with the respective customers. In accordance with this embodiment, the method of flowchart 200 further includes allocating one or more second computing resources among the one or more second applications within the second computing unit, based at least in part on dynamic demands of the one or more second applications for the one or more second computing resources and further based at least in part on the resource limit associated with each customer that is associated with at least one of the one or more second applications. Each second computing resource includes a processor and/or a memory. For instance, the allocation logic 314 may allocate second resources 334B among the second application(s) 324B within the second computing unit 320B, based at least in part on dynamic demands of the second application(s) 324B for the second resources 334B and further based at least in part on the resource limit associated with each customer that is associated with at least one of the second application(s) 324B, as indicated by the resource limit information 330. Any one or more of the first resources 334A may be included among the second resources 334B. Any one or more of the second resources 334B may be included among the first resources 334A. The first resources 334A and the second resources 334B may be mutually exclusive.

In an aspect of this embodiment, allocating the one or more second computing resources among the one or more second applications within the second computing unit is performed while maintaining at least one network connection between a client device of each customer and at least one respective application.

In another example embodiment, the method of flowchart 200 further includes dynamically launching a second computing unit, including second applications of the customers, based at least in part on the dynamic demands of the applications for the computing resources and further based at least in part on the resource limits associated with the respective customers. For instance, the allocation logic 314 may dynamically launch the second computing unit 320B, including the second application(s) 324B of the customers, based at least in part on the dynamic demands of the first application(s) 324A for the first resources 334A, as indicated by the first demand information 332A, and further based at least in part on the resource limits associated with the respective customers, as indicated by the resource limit information 330.

In a first aspect of this embodiment, the method of flowchart 200 further includes re-allocating the computing resources across the applications and the second applications based at least in part on the dynamic demands of the applications for the computing resources, dynamic demands of the second applications for the computing resources, and the resource limits associated with the respective customers while maintaining at least one network connection between a client device of each customer and at least one respective application. For example, the allocation logic 314 may re-allocate the first resources 334A across the first application(s) 324A and the second application(s) 324B based at least in part on the dynamic demands of the first application(s) 324A for the first resources 334A, dynamic demands of the second application(s) 324B for the first resources 334A, and the resource limits associated with the respective customers while maintaining at least one network connection between a client device of each customer and at least one respective application from the first application(s) 324A.

In a second aspect of this embodiment, the method of flowchart 200 further includes allocating second computing resources, which are not included in the computing resources re-allocated at step 206, across the applications and the second applications based at least in part on the dynamic demands of the applications for the second computing resources, dynamic demands of the second applications for the second computing resources, and the resource limits associated with the respective customers while maintaining at least one network connection between a client device of each customer and at least one respective application. Each second computing resource includes a processor and/or a memory. For instance, the allocation logic 314 may allocate second resources 334B, which are not included in the first resources 334A, across the first application(s) 324A and the second application(s) 324B based at least in part on the dynamic demands of the first application(s) 324A for the second resources 334B, dynamic demands of the second application(s) 324B for the second resources 334B, and the resource limits associated with the respective customers while maintaining at least one network connection between a client device of each customer and at least one respective application.

In yet another example embodiment, the method of flowchart 200 further includes terminating the common computing unit and the applications based at least in part on a cumulative demand, which is a sum of the dynamic demands of the applications for the computing resources. In accordance with this embodiment, the common computing unit and the applications may be terminated based at least in part on the cumulative demand being less than or equal to a demand threshold. For example, the allocation logic 314 may terminate the first computing unit 320A and the first application(s) 324A based at least in part on a cumulative demand, which is a sum of the dynamic demands of the first application(s) 324A for the first resources 334A.

It will be recognized that the computing system 300 may not include one or more of the dynamic re-allocation logic 308, the execution logic 312, the allocation logic 314, the limit change logic 316, the store 318, and/or the plurality of computing units 320A-320N. Furthermore, the computing system 300 may include components in addition to or in lieu of the dynamic re-allocation logic 308, the execution logic 312, the allocation logic 314, the limit change logic 316, the store 318, and/or the plurality of computing units 320A-320N.

Figure 4:
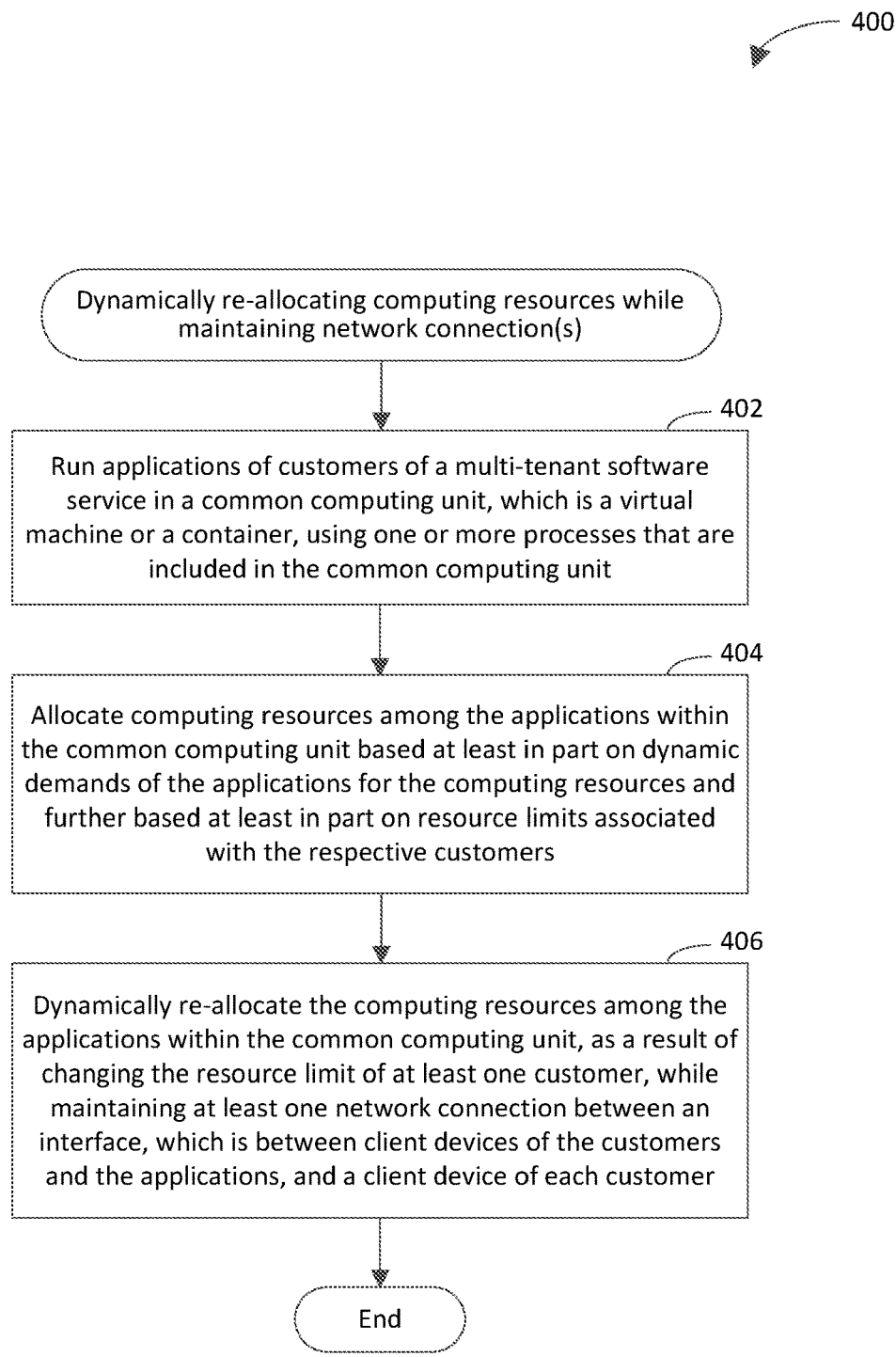
Figure 5:
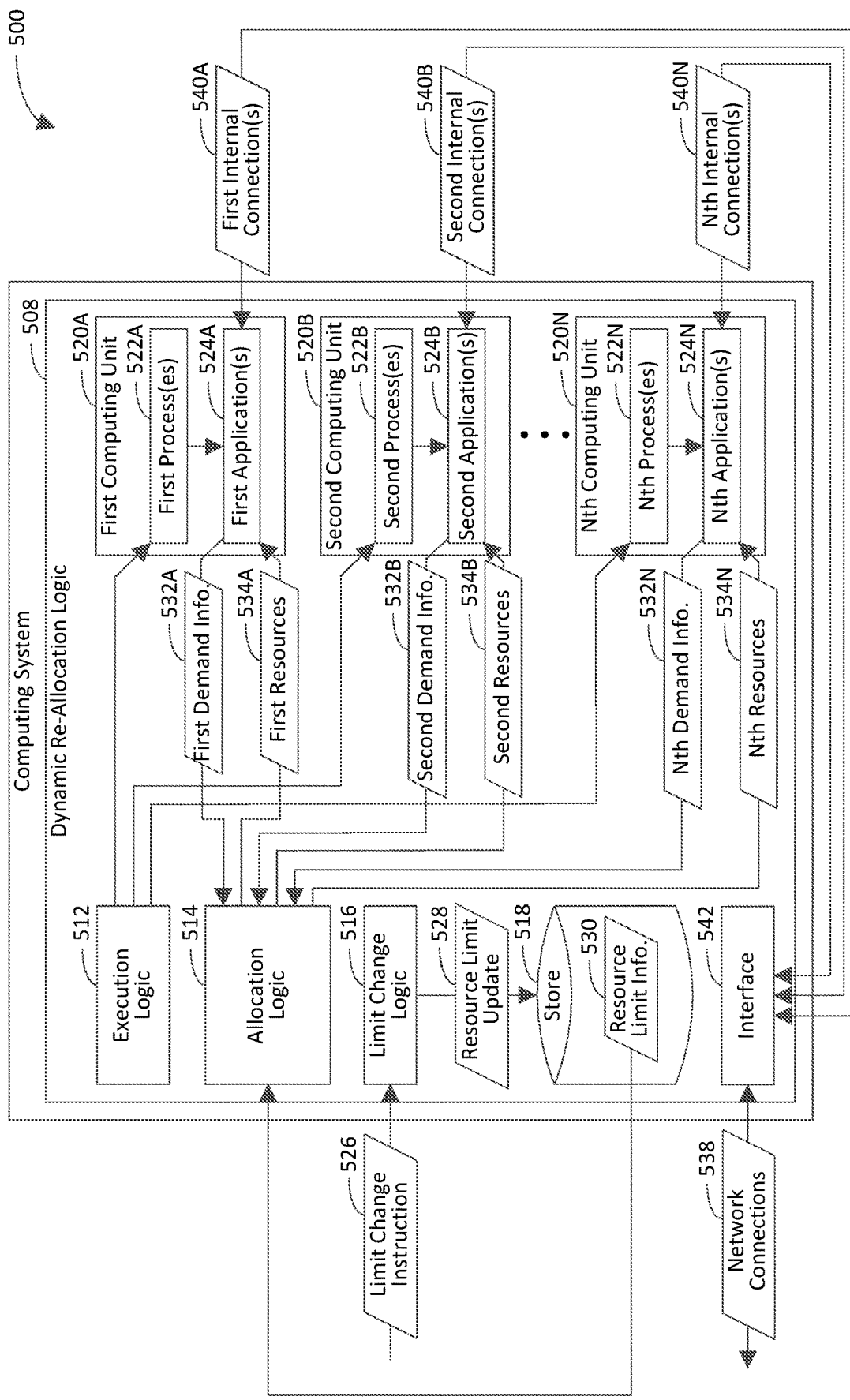

FIG. 4 depicts a flowchart 400 of another example method for dynamically re-allocating computing resources while maintaining network connection(s) in accordance with an embodiment. Flowchart 400 may be performed by the first server(s) 106A, shown in FIG. 1, for example. For illustrative purposes, flowchart 400 is described with respect to a computing system 500 shown in FIG. 5, which is an example implementation of the first server(s) 106A. As shown in FIG. 5, the computing system 500 includes dynamic re-allocation logic 508. The dynamic re-allocation logic 508 includes execution logic 512, allocation logic 514, limit change logic 516, a store 518, a plurality of computing units 520A-520N, and an interface 542. The store 518 may be any suitable type of store. The store 518 is shown to store resource limit information 530 for illustrative purposes. The plurality of computing units 520A-520N includes a plurality of respective processes 522A-522N and a plurality of respective applications 524A-524N. Any two or more of the computing units 520A-520N may be included in a common Kubernetes pod, though the example embodiments are not limited in this respect. Further structural and operational embodiments will be apparent to persons skilled in the relevant art(s) based on the discussion regarding flowchart 400.

As shown in FIG. 4, the method of flowchart 400 begins at step 402. In step 402, applications of customers of a multi-tenant software service are run in a common computing unit using one or more processes that are included in the common computing unit. The common computing unit is a virtual machine or a container. In an example implementation, the execution logic 512 runs the first application(s) 524A of the customers in the first computing unit 520A using the first process(es) 522A, which are included in the first computing unit 520A. For example, the execution logic 512 may control the first process(es) 522A to run the first application(s) 524A. In accordance with this example, the execution logic 512 may provide instructions to the first process(es) 522A that cause the first process(es) 522A to run the first application(s) 524A.

At step 404, computing resources are allocated among the applications within the common computing unit based at least in part on dynamic demands of the applications for the computing resources and further based at least in part on resource limits associated with the respective customers. Each computing resource includes a processor and/or a memory. Each resource limit indicates a maximum amount of the computing resources that is capable of being allocated to the respective customer. In an example implementation, the allocation logic 514 allocates first resources 534A among the first application(s) 524A within the first computing unit 520A based at least in part on first demand information 532A, which indicates the dynamic demands of the first application(s) 524A for the first resources 534A, and further based at least in part on the resource limit information 530, which indicates the resource limits associated with the respective customers.

It should be noted that the applications 524A-524N are capable of generating respective demand information 532A-532N to indicate the dynamic demands of the respective applications 524A-524N for the computing resources, and the allocation logic 514 is capable of allocating resources 534A-534N to the respective computing units 520A-520N based at least in part on the respective demand information 532A-532N and further based at least in part on the resource limits associated with the respective customers.

In an example embodiment, allocating the computing resources at step 404 is performed using one or more controllers that are included in the common computing unit. For example, the first computing unit 520A may further include the one or more controllers. In accordance with this example, the allocation logic 514 may control the one or more controllers to allocate first resources 534A among the first application(s) 524A. For instance, the allocation logic 514 may provide instructions to the one or more controllers that cause the one or more controllers to allocate the first resources 534A among the first application(s) 524A.

At step 406, the computing resources are dynamically re-allocated among the applications within the common computing unit, as a result of changing the resource limit of at least one customer, while maintaining at least one network connection between an interface, which is between client devices of the customers and the applications, and a client device of each of the customers. For instance, the interface may serve as an intermediary between client devices of the customers and the applications.

In an example embodiment, dynamically re-allocating the computing resources at step 406 may include minimizing disruption of existing network connections of the customers. For instance, it may be a goal to maintain as many of the network connections as possible. Accordingly, the computing resources may be dynamically re-allocated without terminating any of the network connections.

In an example embodiment, the common computing unit is a virtual machine. In accordance with this embodiment, dynamically re-allocating the computing resources among the applications within the common computing unit at step 406 is performed without utilizing a container orchestration system (e.g., Kubernetes).

In another example embodiment, dynamically re-allocating the computing resources among the applications within the common computing unit at step 406 is based at least in part on the dynamic demands of the applications for the computing resources and further based at least in part on the resource limits associated with the respective customers. In accordance with this embodiment, the resource limits include the changed resource limit of the at least one customer.

In an example implementation, the allocation logic 514 dynamically re-allocates the first resources 534A among the first application(s) 524A within the first computing unit 520A, as a result of the resource limit of at least one customer changing, while maintaining at least one network connection between the interface 542, which is between client devices of the customers and the first application(s) 524A, and a client device of each customer. For instance, the limit change logic 516 may receive a limit change instruction 526, instructing the limit change logic 516 to change the resource limit of at least one customer. The limit change instruction 526 may indicate each customer whose resource limit is to change and the updated resource limit that is to replace the current resource limit for the respective customer. The limit change logic 516 may generate resource limit update 528, which updates the resource limit of the at least one customer in the resource limit information 530, as instructed by the limit change instruction 526.

It should be noted that, in response to the resource limit of at least one customer changing, the allocation logic 514 is capable of dynamically re-allocating the resources 534A-534N among the respective applications 524A-524N within the respective computing units 520A-520N while maintaining at least one of the network connections 538, which have been established between the client devices of the customers and the interface 542, for each customer.

Internal connections 540A-540N are established between the interface 542 and the respective applications 524A-524N. For instance, the first internal connection(s) 540A are between the interface 542 and the first application(s) 524A; the second internal connection(s) 540B are between the interface 542 and the second application(s) 524B, and so on. A connection between a client device of a customer and an application that is included among the first application 524A includes a respective network connection from the network connections 538, which is established between the client device and the interface 542, and an internal connection from the internal connections 540A, which is established between the interface 542 and the application. A connection between a client device of a customer and an application that is included among the second application 524B includes a respective network connection from the network connections 538, which is established between the client device and the interface 542, and an internal connection from the internal connections 540B, which is established between the interface 542 and the application, and so on. If any one or more of the internal connections 540A-540N are terminated, at least one of the network connections 538 is maintained for each customer. By maintaining at least one of the network connections 538 for each customer, the allocation logic 514 may re-establish a connection between a client device of a customer and an application by re-establishing the corresponding internal connection that was terminated between the interface 542 and the application.

In an example embodiment, allocating the computing resources at step 404 and/or re-allocating the computing resources at step 406 may be based at least in part on an amount that each customer pays for use of the multi-tenant software service.

In some example embodiments, one or more steps 402, 404, and/or 406 of flowchart 400 may not be performed. Moreover, steps in addition to or in lieu of steps 402, 404, and/or 406 may be performed. For instance, in an example embodiment, the method of flowchart 400 further includes, while maintaining the at least one network connection between a client device of each customer and the interface, determining that at least one connection between the interface and at least one respective application is disconnected. For example, while maintaining the at least one network connection between a client device of each customer and the interface 542, the allocation logic 514 may determine that at least one connection (e.g., at least one of the first internal connection(s) 540A) between the interface 542 and at least one respective application, which is included among the first application(s) 524A, is disconnected. In accordance with this embodiment, the method of flowchart 400 further includes, while maintaining the at least one network connection between a client device of each customer and the interface, automatically re-connecting the at least one connection between the interface and the at least one respective application based at least in part on a determination that the at least one connection is disconnected. For instance, while maintaining the at least one network connection between a client device of each customer and the interface 542, the allocation logic 514 may automatically re-connect the at least one connection between the interface 542 and the at least one respective application based at least in part on a determination that the at least one connection is disconnected.

In an aspect of this embodiment, determining that the at least one connection between the interface and the at least one respective application is disconnected results from operation of the common computing unit being disrupted. For example, the allocation logic 514 may determine that the at least one connection between the interface 542 and the at least one respective application is disconnected as a result of operation of the first computing unit 520A being disrupted. In accordance with this embodiment, the method of flowchart 400 further includes automatically relaunching the common computing unit based at least in part on the operation of the common computing unit being disrupted. For instance, the allocation logic 514 may automatically relaunch the first computing unit 520A based at least in part on the operation of the first computing unit 520A being disrupted. In further accordance with this embodiment, automatically re-connecting the at least one connection between the interface and the at least one respective application is further based at least in part on the common computing unit being automatically relaunched. For example, the allocation logic 514 may automatically re-connect the at least one connection between the interface 542 and the at least one respective application further based at least in part on the first computing unit 520A being automatically relaunched.

In another example embodiment, the method of flowchart 400 further includes dynamically launching a second computing unit, including one or more second applications, based at least in part on a cumulative demand and further based at least in part on the resource limits associated with the respective customers. The cumulative demand is a sum of the dynamic demands of the applications for the computing resources. For example, the allocation logic 514 may dynamically launch the second computing unit 520B, including the second application(s) 524B, based at least in part on the cumulative demand and further based at least in part on the resource limits associated with the respective customers. In accordance with this example, the cumulative demand may be a sum of the dynamic demands of the first application(s) 524A for the first resources 534A, as indicated by the first demand information 532A. In further accordance with this example, the allocation logic 514 may analyze the resource limit information 530 to determine the resource limits associated with the respective customers. In accordance with this embodiment, the method of flowchart 400 further includes allocating one or more second computing resources among the one or more second applications within the second computing unit, based at least in part on dynamic demands of the one or more second applications for the one or more second computing resources and further based at least in part on the resource limit associated with each customer that is associated with at least one of the one or more second applications. Each second computing resource includes a processor and/or a memory. For instance, the allocation logic 514 may allocate second resources 534B among the second application(s) 524B within the second computing unit 520B, based at least in part on dynamic demands of the second application(s) 524B for the second resources 534B and further based at least in part on the resource limit associated with each customer that is associated with at least one of the second application(s) 524B, as indicated by the resource limit information 530.

In an aspect of this embodiment, allocating the one or more second computing resources among the one or more second applications within the second computing unit is performed while maintaining at least one network connection between a client device of each customer and the interface.

In another example embodiment, the method of flowchart 400 further includes dynamically launching a second computing unit, including second applications of the customers, based at least in part on the dynamic demands of the applications for the computing resources and further based at least in part on the resource limits associated with the respective customers. For instance, the allocation logic 514 may dynamically launch the second computing unit 520B, including the second application(s) 524B of the customers, based at least in part on the dynamic demands of the first application(s) 524A for the first resources 534A, as indicated by the first demand information 532A, and further based at least in part on the resource limits associated with the respective customers, as indicated by the resource limit information 530.

In a first aspect of this embodiment, the method of flowchart 400 further includes re-allocating the computing resources across the applications and the second applications based at least in part on the dynamic demands of the applications for the computing resources, dynamic demands of the second applications for the computing resources, and the resource limits associated with the respective customers while maintaining at least one network connection between a client device of each customer and the interface. For example, the allocation logic 514 may re-allocate the first resources 534A across the first application(s) 524A and the second application(s) 524B based at least in part on the dynamic demands of the first application(s) 524A for the first resources 534A, dynamic demands of the second application(s) 524B for the first resources 534A, and the resource limits associated with the respective customers while maintaining at least one network connection between a client device of each customer and the interface 542.

In a second aspect of this embodiment, the method of flowchart 400 further includes allocating second computing resources, which are not included in the computing resources re-allocated at step 406, across the applications and the second applications based at least in part on the dynamic demands of the applications for the second computing resources, dynamic demands of the second applications for the second computing resources, and the resource limits associated with the respective customers while maintaining at least one network connection between a client device of each customer and the interface. Each second computing resource includes a processor and/or a memory. For instance, the allocation logic 514 may allocate second resources 534B, which are not included in the first resources 534A, across the first application(s) 524A and the second application(s) 524B based at least in part on the dynamic demands of the first application(s) 524A for the second resources 534B, dynamic demands of the second application(s) 524B for the second resources 534B, and the resource limits associated with the respective customers while maintaining at least one network connection between a client device of each customer and the interface 542.

In yet another example embodiment, the method of flowchart 400 further includes terminating the common computing unit and the applications based at least in part on a cumulative demand, which is a sum of the dynamic demands of the applications for the computing resources. In accordance with this embodiment, the common computing unit and the applications may be terminated based at least in part on the cumulative demand being less than or equal to a demand threshold. For example, the allocation logic 514 may terminate the first computing unit 520A and the first application(s) 524A based at least in part on a cumulative demand, which is a sum of the dynamic demands of the first application(s) 524A for the first resources 534A.

It will be recognized that the computing system 500 may not include one or more of the dynamic re-allocation logic 508, the execution logic 512, the allocation logic 514, the limit change logic 516, the store 518, the plurality of computing units 520A-520N, and/or the interface 542. Furthermore, the computing system 300 may include components in addition to or in lieu of the dynamic re-allocation logic 508, the execution logic 512, the allocation logic 514, the limit change logic 516, the store 518, the plurality of computing units 520A-520N, and/or the interface 542.

Figure 6:
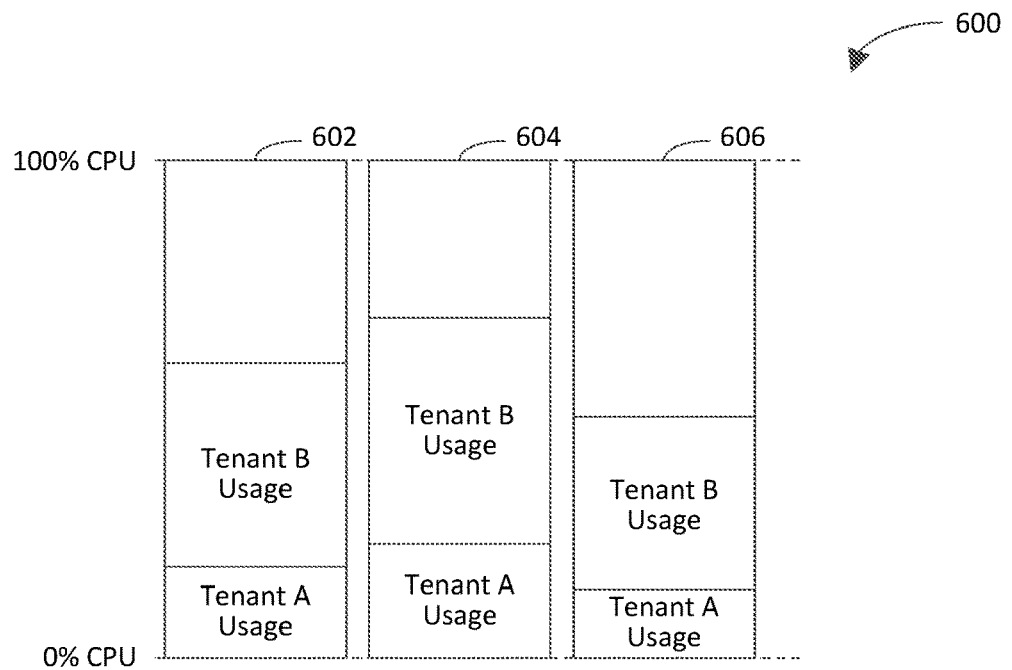
FIGS. 6-10 are bar charts that illustrate example allocations of central processing unit (CPU) computing resources among applications in computing units in accordance with embodiments.

FIGS. 6-10 are bar charts 600, 700, 800, 900, and 1000 that illustrate example allocations of central processing unit (CPU) computing resources among applications in computing units in accordance with embodiments. As shown in FIG. 6, applications of tenants A and B (a.k.a. customers A and B) share usage of the CPU computing resources in computing units 602, 604, and 606. Application(s) of tenant A are allocated a first portion of the CPU computing resources in each of the computing units 602, 604, and 606. Application(s) of tenant B are allocated a second portion of the CPU computing resources in each of the computing units 602, 604, and 606.

Figure 7:
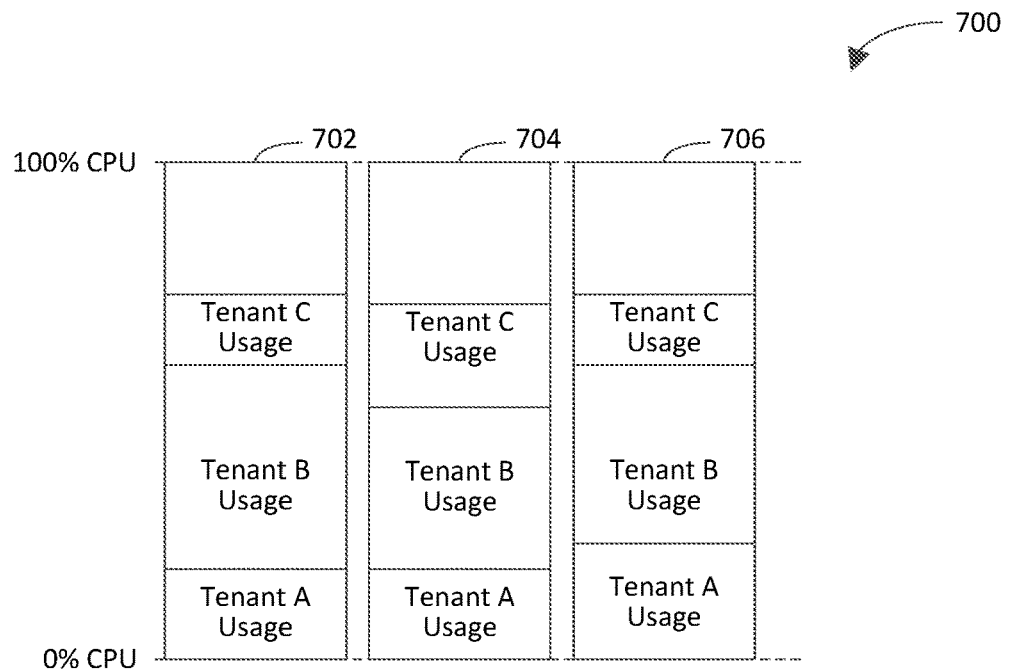

As shown in FIG. 7, applications of tenants A, B, and C share usage of the CPU computing resources in computing units 702, 704, and 706. If the cumulative demand of the applications of the tenants A, B, and C in each of the computing units 702, 704, and 706 remains below a demand threshold (e.g., 100%), the allocation of the CPU computing resources among the applications of the tenants A, B, and C in the respective computing unit may be increased or decreased without a need to launch additional computing unit(s). By maintaining the cumulative demand of the applications of the tenants A, B, and C in each of the computing units 702, 704, and 706 below the demand threshold, stability of a multi-tenant software service that includes the computing units 702, 704, and 706 and a computing system that executes the multi-tenant software service may be increased.

Figure 8:
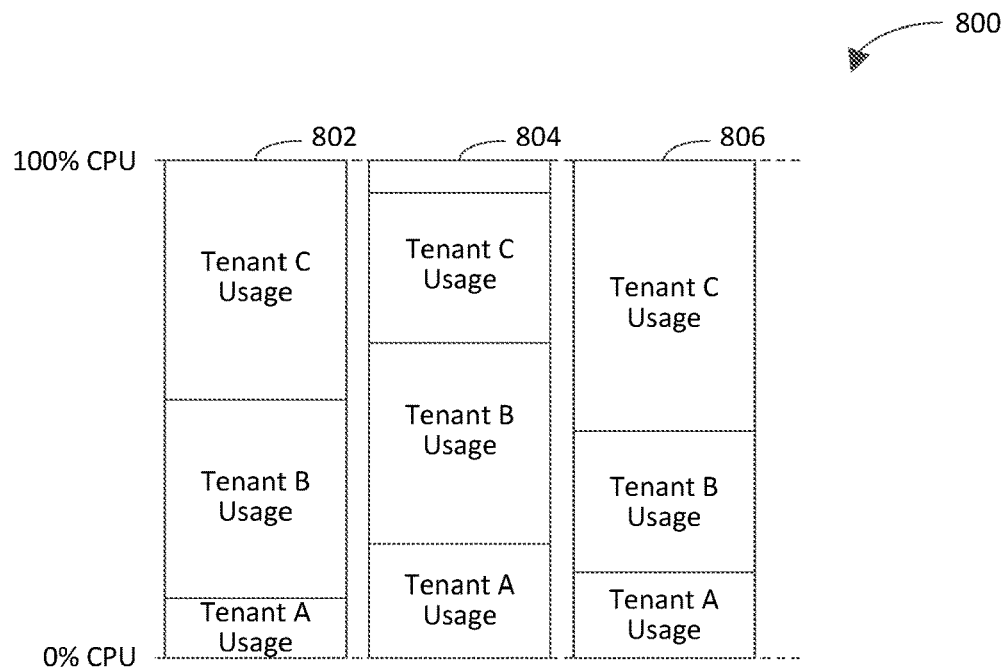

As shown in FIG. 8, applications of tenants A, B, and C share usage of the CPU computing resources in computing units 802, 804, and 806. When the applications of one or more of the tenants A, B, and C consume more of the CPU computing resources in a computing unit such that the cumulative demand for the CPU computing resources in the computing unit exceed the demand threshold, the portion of the CPU computing resources that is allocated to each of the tenants A, B, and C may be determined based on an amount that the respective tenant paid for use of the multi-tenant software service. For instance, application(s) of a tenant who pays more may be allocated a relatively larger portion of the CPU computing resources in the computing unit, whereas application(s) of a tenant who pays less may be allocated a relatively smaller portion of the CPU computing resources in the computing unit.

Figure 9:
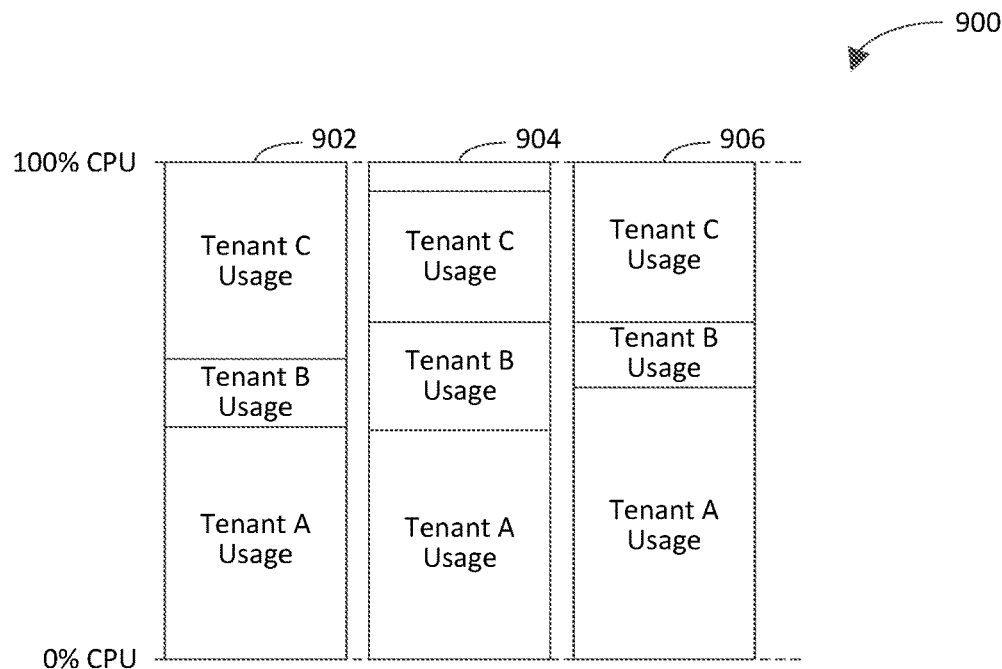

As shown in FIG. 9, applications of tenants A, B, and C share usage of the CPU computing resources in computing units 902, 904, and 906. If the resource limit of tenant A is increased (e.g., as a result of tenant A paying an increased fee for use of the multi-tenant software service), a proportion of the CPU computing resources allocated to tenant A (e.g., in each of the computing units 902, 904, and 906) may be increased. This increase is illustrated by comparing the allocations of the CPU computing resources in FIG. 8 (i.e., prior to the resource limit of tenant A being increased) to the allocations of the CPU computing resources in FIG. 9 (i.e., after the resource limit of tenant A is increased).

Figure 10:
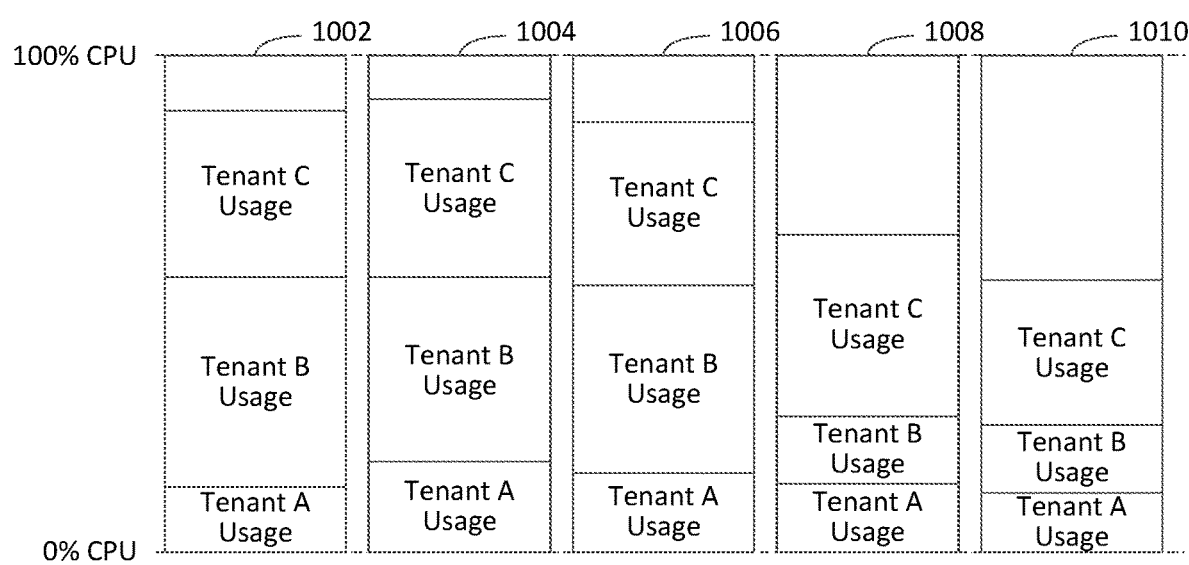

As shown in FIG. 10, applications of tenants A, B, and C share usage of the CPU computing resources in computing units 1002, 1004, 1006, 1008, and 1010. It can be seen that two computing units have been added in FIG. 10, as compared to FIG. 9. For instance, the two additional computing units may have been launched to handle some of the demands of the tenants A, B, and C for the CPU computing resources. Accordingly, the CPU computing resources are shown to have been re-allocated among the computing units 1002, 1004, 1006, 1008, and 1010 such that the cumulative demand for the CPU computing resources in each of the computing units 1002, 1004, 1006, 1008, and 1010 is less than the demand threshold. Each of the tenants A, B, and C has at least one application in each of the computing units 1002, 1004, 1006, 1008, and 1010. For instance, each of the computing units 1002, 1004, 1006, 1008, and 1010 may service all of the tenants A, B, and C.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the dynamic re-allocation logic 108, the dynamic re-allocation logic 308, the execution logic 312, the allocation logic 314, the limit change logic 316, the store 318, the plurality of computing units 320A-320N, the dynamic re-allocation logic 508, the execution logic 512, the allocation logic 514, the limit change logic 516, the store 518, the plurality of computing units 520A-520N, the interface 542, flowchart 200, and/or flowchart 400 may be implemented in hardware, software, firmware, or any combination thereof.

For example, any one or more of the dynamic re-allocation logic 108, the dynamic re-allocation logic 308, the execution logic 312, the allocation logic 314, the limit change logic 316, the store 318, the plurality of computing units 320A-320N, the dynamic re-allocation logic 508, the execution logic 512, the allocation logic 514, the limit change logic 516, the store 518, the plurality of computing units 520A-520N, the interface 542, flowchart 200, and/or flowchart 400 may be implemented, at least in part, as computer program code configured to be executed in a processing system.

In another example, any one or more of the dynamic re-allocation logic 108, the dynamic re-allocation logic 308, the execution logic 312, the allocation logic 314, the limit change logic 316, the store 318, the plurality of computing units 320A-320N, the dynamic re-allocation logic 508, the execution logic 512, the allocation logic 514, the limit change logic 516, the store 518, the plurality of computing units 520A-520N, the interface 542, flowchart 200, and/or flowchart 400 may be implemented, at least in part, as hardware logic/electrical circuitry. Such hardware logic/electrical circuitry may include one or more hardware logic components. Examples of a hardware logic component include a field-programmable gate array (FPGA), an application-specific integrated circuit (ASIC), an application-specific standard product (ASSP), a system-on-a-chip system (SoC), and a complex programmable logic device (CPLD). For instance, a SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

Figure 11:
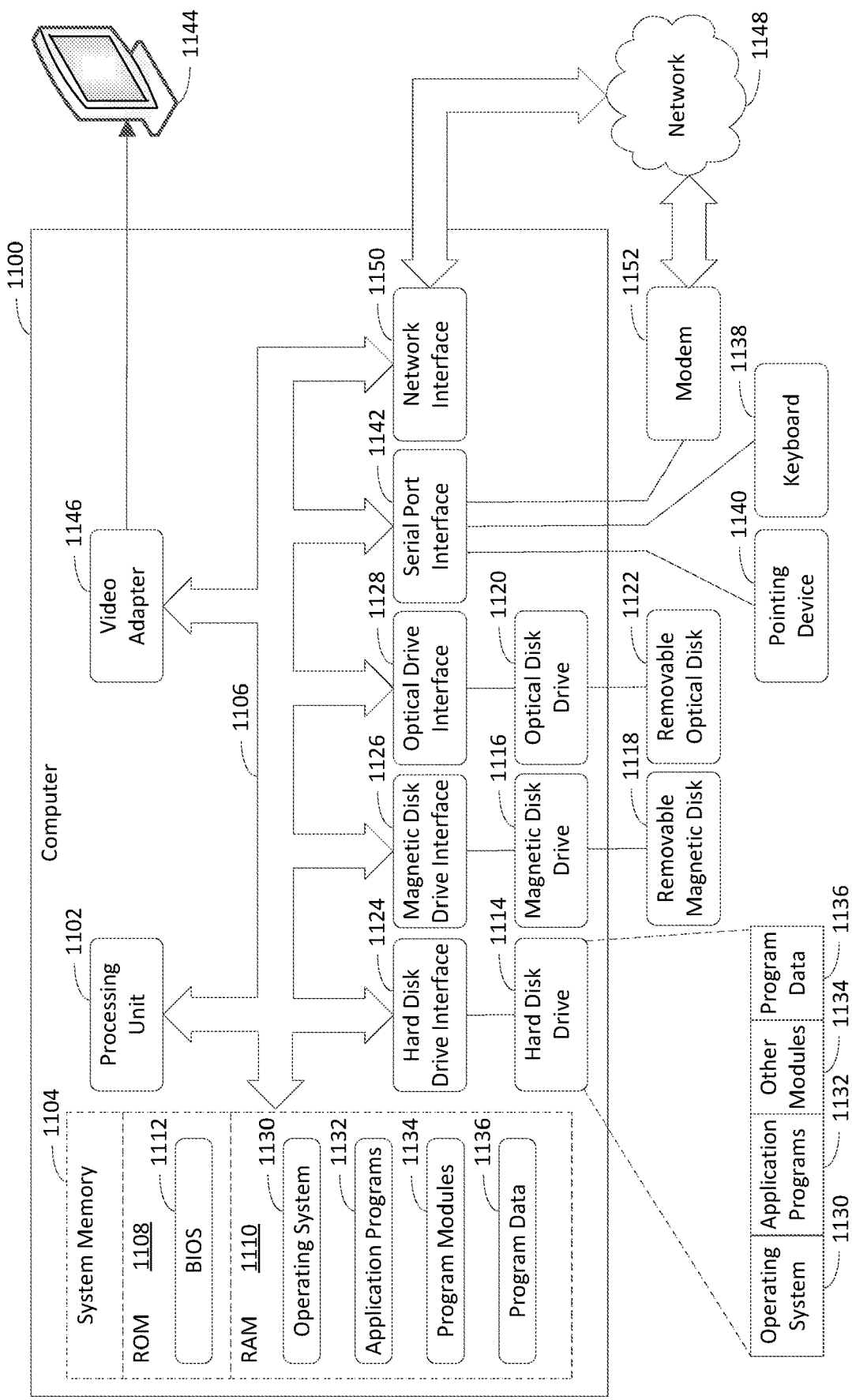
FIG. 11 depicts an example computer in which embodiments may be implemented.

III. Further Discussion of Some Example Embodiments (A1) A first example system (FIG. 1, 102A-102M, 106A-106N; FIG. 3, 300; FIG. 11, 1100) comprises a memory (FIG. 11, 1104, 1108, 1110) and a processing system (FIG. 11, 1102) coupled to the memory. The processing system is configured to run (FIG. 2, 202) a plurality of applications (FIG. 3, 324A-324N) of a plurality of customers of a multi-tenant software service in a common computing unit (FIG. 3, 320A), which is a virtual machine or a container, using one or more processes (FIG. 3, 322A) that are included in the common computing unit. The processing system is further configured to allocate (FIG. 2, 204) a plurality of computing resources (FIG. 3, 334A-334N) among the plurality of applications within the common computing unit based at least in part on dynamic demands of the plurality of applications for the plurality of computing resources and further based at least in part on a plurality of resource limits associated with the plurality of respective customers. Each computing resource includes at least one of a processor or a memory. Each resource limit indicates a maximum amount of the plurality of computing resources that is capable of being allocated to the respective customer. The processing system is further configured to dynamically re-allocate (FIG. 2, 206) the plurality of computing resources among the plurality of applications within the common computing unit, as a result of changing the resource limit of at least one customer, while maintaining at least one network connection (FIG. 3, 336A-336N) between a client device (FIG. 1, 102A-102M) of each customer of the plurality of customers and at least one respective application of the plurality of applications.

(A2) In the system of A1, wherein the processing system is configured to: allocate the plurality of computing resources among the plurality of applications using one or more controllers that are included in the common computing unit.

(A3) In the system of any of A1-A2, wherein the common computing unit is the virtual machine; and wherein the processing system is configured to: dynamically re-allocate the plurality of computing resources among the plurality of applications within the common computing unit without utilizing a container orchestration system.

(A4) In the system of any of A1-A3, wherein the processing system is configured to: dynamically re-allocate the plurality of computing resources among the plurality of applications within the common computing unit based at least in part on the dynamic demands of the plurality of applications for the plurality of computing resources and further based at least in part on the plurality of resource limits associated with the plurality of respective customers, the plurality of resource limits including the changed resource limit of the at least one customer.

(A5) In the system of any of A1-A4, wherein the processing system is further configured to: dynamically launch a second computing unit, including one or more second applications, based at least in part on a cumulative demand, which is a sum of the dynamic demands of the plurality of applications for the plurality of computing resources, and further based at least in part on the plurality of resource limits associated with the plurality of respective customers; and allocate one or more second computing resources among the one or more second applications within the second computing unit, based at least in part on dynamic demands of the one or more second applications for the one or more second computing resources and further based at least in part on the resource limit associated with each customer that is associated with at least one of the one or more second applications, each second computing resource including at least one of a processor or a memory.

(A6) In the system of any of A1-A5, wherein the processing system is configured to: allocate the one or more second computing resources among the one or more second applications within the second computing unit while maintaining at least one network connection between a client device of each customer of the plurality of customers and at least one respective application of the plurality of applications.

(A7) In the system of any of A1-A6, wherein the processing system is further configured to: dynamically launch a second computing unit, including a plurality of second applications of the plurality of customers, based at least in part on the dynamic demands of the plurality of applications for the plurality of computing resources and further based at least in part on the plurality of resource limits associated with the plurality of respective customers; and re-allocate the plurality of computing resources across the plurality of applications and the plurality of second applications based at least in part on the dynamic demands of the plurality of applications for the plurality of computing resources, dynamic demands of the plurality of second applications for the plurality of computing resources, and the plurality of resource limits associated with the plurality of respective customers while maintaining at least one network connection between a client device of each customer of the plurality of customers and at least one respective application of the plurality of applications.

(A8) In the system of any of A1-A7, wherein the processing system is further configured to: dynamically launch a second computing unit, including a plurality of second applications of the plurality of customers, based at least in part on the dynamic demands of the plurality of applications for the plurality of computing resources and further based at least in part on the plurality of resource limits associated with the plurality of respective customers; and allocate a plurality of second computing resources, which is not included in the plurality of computing resources, across the plurality of applications and the plurality of second applications based at least in part on the dynamic demands of the plurality of applications for the plurality of second computing resources, dynamic demands of the plurality of second applications for the plurality of second computing resources, and the plurality of resource limits associated with the plurality of respective customers while maintaining at least one network connection between a client device of each customer of the plurality of customers and at least one respective application of the plurality of applications, each second computing resource including at least one of a processor or a memory.

(A9) In the system of any of A1-A8, wherein the processing system is further configured to: terminate the common computing unit and the plurality of applications based at least in part on a cumulative demand, which is a sum of the dynamic demands of the plurality of applications for the plurality of computing resources.

(B1) A second example system (FIG. 1, 102A-102M, 106A-106N; FIG. 3, 300; FIG. 11, 1100) comprises a memory (FIG. 11, 1104, 1108, 1110), an interface, and a processing system (FIG. 11, 1102) coupled to the memory. The interface is between a plurality of client devices of a plurality of customers of a multi-tenant software service and a plurality of applications. run (FIG. 4, 402) a plurality of applications (FIG. 5, 524A-524N) of a plurality of customers of a multi-tenant software service in a common computing unit (FIG. 5, 520A), which is a virtual machine or a container, using one or more processes (FIG. 5, 522A) that are included in the common computing unit. The processing system is further configured to allocate (FIG. 4, 404) a plurality of computing resources (FIG. 5, 534A-534N) among the plurality of applications within the common computing unit based at least in part on dynamic demands of the plurality of applications for the plurality of computing resources and further based at least in part on a plurality of resource limits associated with the plurality of respective customers. Each computing resource includes at least one of a processor or a memory. Each resource limit indicates a maximum amount of the plurality of computing resources that is capable of being allocated to the respective customer. The processing system is further configured to dynamically re-allocate (FIG. 4, 406) the plurality of computing resources among the plurality of applications within the common computing unit, as a result of changing the resource limit of at least one customer, while maintaining at least one network connection between a client device (FIG. 1, 102A-102M) of each customer of the plurality of customers and the interface.

(B2) In the system of B1, wherein the processing system is further configured to: while maintaining the at least one network connection between the client device of each customer and the interface, perform the following operations: determine that at least one connection between the interface and at least one respective application of the plurality of applications is disconnected; and automatically re-connect the at least one connection between the interface and the at least one respective application based at least in part on a determination that the at least one connection is disconnected.

(B3) In the system of any of B1-B2, wherein the processing system is configured to: determine that the at least one connection between the interface and the at least one respective application is disconnected as a result of operation of the common computing unit being disrupted; automatically relaunch the common computing unit based at least in part on the operation of the common computing unit being disrupted; and automatically re-connect the at least one connection between the interface and the at least one respective application further based at least in part on the common computing unit being automatically relaunched.

(B4) In the system of any of B1-B3, wherein the processing system is configured to: allocate the plurality of computing resources among the plurality of applications using one or more controllers that are included in the common computing unit.

(B5) In the system of any of B1-B4, wherein the common computing unit is the virtual machine; and wherein the processing system is configured to: dynamically re-allocate the plurality of computing resources among the plurality of applications within the common computing unit without utilizing a container orchestration system.

(B6) In the system of any of B1-B5, wherein the processing system is configured to: dynamically re-allocate the plurality of computing resources among the plurality of applications within the common computing unit based at least in part on the dynamic demands of the plurality of applications for the plurality of computing resources and further based at least in part on the plurality of resource limits associated with the plurality of respective customers, the plurality of resource limits including the changed resource limit of the at least one customer.

(B7) In the system of any of B1-B6, wherein the processing system is further configured to: dynamically launch a second computing unit, including one or more second applications, based at least in part on a cumulative demand, which is a sum of the dynamic demands of the plurality of applications for the plurality of computing resources, and further based at least in part on the plurality of resource limits associated with the plurality of respective customers; and allocate one or more second computing resources among the one or more second applications within the second computing unit, based at least in part on dynamic demands of the one or more second applications for the one or more second computing resources and further based at least in part on the resource limit associated with each customer that is associated with at least one of the one or more second applications, each second computing resource including at least one of a processor or a memory.

(B8) In the system of any of B1-B7, wherein the processing system is configured to: allocate the one or more second computing resources among the one or more second applications within the second computing unit while maintaining at least one network connection between a client device of each customer of the plurality of customers and the interface.

(B9) In the system of any of B1-B8, wherein the processing system is further configured to: dynamically launch a second computing unit, including a plurality of second applications of the plurality of customers, based at least in part on the dynamic demands of the plurality of applications for the plurality of computing resources and further based at least in part on the plurality of resource limits associated with the plurality of respective customers; and re-allocate the plurality of computing resources across the plurality of applications and the plurality of second applications based at least in part on the dynamic demands of the plurality of applications for the plurality of computing resources, dynamic demands of the plurality of second applications for the plurality of computing resources, and the plurality of resource limits associated with the plurality of respective customers while maintaining at least one network connection between a client device of each customer of the plurality of customers and the interface.

(B10) In the system of any of B1-B9, wherein the processing system is further configured to: dynamically launch a second computing unit, including a plurality of second applications of the plurality of customers, based at least in part on the dynamic demands of the plurality of applications for the plurality of computing resources and further based at least in part on the plurality of resource limits associated with the plurality of respective customers; and allocate a plurality of second computing resources, which is not included in the plurality of computing resources, across the plurality of applications and the plurality of second applications based at least in part on the dynamic demands of the plurality of applications for the plurality of second computing resources, dynamic demands of the plurality of second applications for the plurality of second computing resources, and the plurality of resource limits associated with the plurality of respective customers while maintaining at least one network connection between a client device of each customer of the plurality of customers and the interface, each second computing resource including at least one of a processor or a memory.

(B11) In the system of any of B1-B10, wherein the processing system is further configured to: terminate the common computing unit and the plurality of applications based at least in part on a cumulative demand, which is a sum of the dynamic demands of the plurality of applications for the plurality of computing resources.

(C1) A first example method, which is implemented by a computing system (FIG. 1, 102A-102M, 106A-106N; FIG. 3, 300; FIG. 11, 1100), comprises running (FIG. 2, 202) a plurality of applications (FIG. 3, 324A-324N) of a plurality of customers of a multi-tenant software service in a common computing unit (FIG. 3, 320A), which is a virtual machine or a container, using one or more processes (FIG. 3, 322A) that are included in the common computing unit. The first example method further comprises allocating (FIG. 2, 204) a plurality of computing resources (FIG. 3, 334A-334N) among the plurality of applications within the common computing unit based at least in part on dynamic demands of the plurality of applications for the plurality of computing resources and further based at least in part on a plurality of resource limits associated with the plurality of respective customers. Each computing resource includes at least one of a processor or a memory. Each resource limit indicates a maximum amount of the plurality of computing resources that is capable of being allocated to the respective customer. The first example method further comprises dynamically re-allocating (FIG. 2, 206) the plurality of computing resources among the plurality of applications within the common computing unit, as a result of changing the resource limit of at least one customer, while maintaining at least one network connection (FIG. 3, 336A-336N) between a client device (FIG. 1, 102A-102M) of each customer of the plurality of customers and at least one respective application of the plurality of applications.

(C2) In the method of C1, wherein allocating the plurality of computing resources comprises: allocating the plurality of computing resources among the plurality of applications using one or more controllers that are included in the common computing unit.

(C3) In the method of any of C1-C2, wherein the common computing unit is the virtual machine; and wherein dynamically re-allocating the plurality of computing resources comprises: dynamically re-allocating the plurality of computing resources among the plurality of applications within the common computing unit without utilizing a container orchestration system.

(C4) In the method of any of C1-C3, wherein dynamically re-allocating the plurality of computing resources comprises: dynamically re-allocating the plurality of computing resources among the plurality of applications within the common computing unit based at least in part on the dynamic demands of the plurality of applications for the plurality of computing resources and further based at least in part on the plurality of resource limits associated with the plurality of respective customers, the plurality of resource limits including the changed resource limit of the at least one customer.

(C5) In the method of any of C1-C4, further comprising: dynamically launching a second computing unit, including one or more second applications, based at least in part on a cumulative demand, which is a sum of the dynamic demands of the plurality of applications for the plurality of computing resources, and further based at least in part on the plurality of resource limits associated with the plurality of respective customers; and allocating one or more second computing resources among the one or more second applications within the second computing unit, based at least in part on dynamic demands of the one or more second applications for the one or more second computing resources and further based at least in part on the resource limit associated with each customer that is associated with at least one of the one or more second applications, each second computing resource including at least one of a processor or a memory.

(C6) In the method of any of C1-C5, wherein allocating the one or more second computing resources comprises: allocating the one or more second computing resources among the one or more second applications within the second computing unit while maintaining at least one network connection between a client device of each customer of the plurality of customers and at least one respective application of the plurality of applications.

(C7) In the method of any of C1-C6, further comprising: dynamically launching a second computing unit, including a plurality of second applications of the plurality of customers, based at least in part on the dynamic demands of the plurality of applications for the plurality of computing resources and further based at least in part on the plurality of resource limits associated with the plurality of respective customers; and re-allocating the plurality of computing resources across the plurality of applications and the plurality of second applications based at least in part on the dynamic demands of the plurality of applications for the plurality of computing resources, dynamic demands of the plurality of second applications for the plurality of computing resources, and the plurality of resource limits associated with the plurality of respective customers while maintaining at least one network connection between a client device of each customer of the plurality of customers and at least one respective application of the plurality of applications.

(C8) In the method of any of C1-C7, further comprising: dynamically launching a second computing unit, including a plurality of second applications of the plurality of customers, based at least in part on the dynamic demands of the plurality of applications for the plurality of computing resources and further based at least in part on the plurality of resource limits associated with the plurality of respective customers; and allocating a plurality of second computing resources, which is not included in the plurality of computing resources, across the plurality of applications and the plurality of second applications based at least in part on the dynamic demands of the plurality of applications for the plurality of second computing resources, dynamic demands of the plurality of second applications for the plurality of second computing resources, and the plurality of resource limits associated with the plurality of respective customers while maintaining at least one network connection between a client device of each customer of the plurality of customers and at least one respective application of the plurality of applications, each second computing resource including at least one of a processor or a memory.

(C9) In the method of any of C1-C8, further comprising: terminating the common computing unit and the plurality of applications based at least in part on a cumulative demand, which is a sum of the dynamic demands of the plurality of applications for the plurality of computing resources.

(D1) A second example method, which is implemented by a computing system (FIG. 1, 102A-102M, 106A-106N; FIG. 5, 500; FIG. 11, 1100), comprises running (FIG. 4, 402) a plurality of applications (FIG. 5, 524A-524N) of a plurality of customers of a multi-tenant software service in a common computing unit (FIG. 5, 520A), which is a virtual machine or a container, using one or more processes (FIG. 5, 522A) that are included in the common computing unit. The first example method further comprises allocating (FIG. 4, 404) a plurality of computing resources (FIG. 5, 534A-534N) among the plurality of applications within the common computing unit based at least in part on dynamic demands of the plurality of applications for the plurality of computing resources and further based at least in part on a plurality of resource limits associated with the plurality of respective customers. Each computing resource includes at least one of a processor or a memory. Each resource limit indicates a maximum amount of the plurality of computing resources that is capable of being allocated to the respective customer. The first example method further comprises dynamically re-allocating (FIG. 4, 406) the plurality of computing resources among the plurality of applications within the common computing unit, as a result of changing the resource limit of at least one customer, while maintaining at least one network connection (FIG. 5, 538) between an interface (FIG. 5, 542), which is between a plurality of client devices (FIG. 1, 102A-102M) of the plurality of customers and the plurality of applications, and a client device of each customer of the plurality of customers.

(D2) In the method of D1, further comprising: while maintaining the at least one network connection between the client device of each customer and the interface, perform the following operations: determining that at least one connection between the interface and at least one respective application of the plurality of applications is disconnected; and automatically re-connecting the at least one connection between the interface and the at least one respective application based at least in part on a determination that the at least one connection is disconnected.

(D3) In the method of any of D1-D2, wherein determining that the at least one connection between the interface and the at least one respective application is disconnected comprises: determining that the at least one connection between the interface and the at least one respective application is disconnected as a result of operation of the common computing unit being disrupted; wherein the method further comprises: automatically relaunching the common computing unit based at least in part on the operation of the common computing unit being disrupted; and wherein automatically re-connecting the at least one connection between the interface and the at least one respective application is further based at least in part on the common computing unit being automatically relaunched.

(D4) In the method of any of D1-D3, wherein allocating the plurality of computing resources among the plurality of applications comprises: allocating the plurality of computing resources among the plurality of applications using one or more controllers that are included in the common computing unit.

(D5) In the method of any of D1-D4, wherein the common computing unit is the virtual machine; and wherein dynamically re-allocating the plurality of computing resources comprises: dynamically re-allocating the plurality of computing resources among the plurality of applications within the common computing unit without utilizing a container orchestration system.

(D6) In the method of any of D1-D5, wherein dynamically re-allocating the plurality of computing resources comprises: dynamically re-allocating the plurality of computing resources among the plurality of applications within the common computing unit based at least in part on the dynamic demands of the plurality of applications for the plurality of computing resources and further based at least in part on the plurality of resource limits associated with the plurality of respective customers, the plurality of resource limits including the changed resource limit of the at least one customer.

(D7) In the method of any of D1-D6, further comprising: dynamically launching a second computing unit, including one or more second applications, based at least in part on a cumulative demand, which is a sum of the dynamic demands of the plurality of applications for the plurality of computing resources, and further based at least in part on the plurality of resource limits associated with the plurality of respective customers; and allocating one or more second computing resources among the one or more second applications within the second computing unit, based at least in part on dynamic demands of the one or more second applications for the one or more second computing resources and further based at least in part on the resource limit associated with each customer that is associated with at least one of the one or more second applications, each second computing resource including at least one of a processor or a memory.

(D8) In the method of any of D1-D7, wherein allocating the one or more second computing resources comprises: allocating the one or more second computing resources among the one or more second applications within the second computing unit while maintaining at least one network connection between a client device of each customer of the plurality of customers and the interface.

(D9) In the method of any of D1-D8, further comprising: dynamically launching a second computing unit, including a plurality of second applications of the plurality of customers, based at least in part on the dynamic demands of the plurality of applications for the plurality of computing resources and further based at least in part on the plurality of resource limits associated with the plurality of respective customers; and re-allocating the plurality of computing resources across the plurality of applications and the plurality of second applications based at least in part on the dynamic demands of the plurality of applications for the plurality of computing resources, dynamic demands of the plurality of second applications for the plurality of computing resources, and the plurality of resource limits associated with the plurality of respective customers while maintaining at least one network connection between a client device of each customer of the plurality of customers and the interface.

(D10) In the method of any of D1-D9, further comprising: dynamically launching a second computing unit, including a plurality of second applications of the plurality of customers, based at least in part on the dynamic demands of the plurality of applications for the plurality of computing resources and further based at least in part on the plurality of resource limits associated with the plurality of respective customers; and allocating a plurality of second computing resources, which is not included in the plurality of computing resources, across the plurality of applications and the plurality of second applications based at least in part on the dynamic demands of the plurality of applications for the plurality of second computing resources, dynamic demands of the plurality of second applications for the plurality of second computing resources, and the plurality of resource limits associated with the plurality of respective customers while maintaining at least one network connection between a client device of each customer of the plurality of customers and the interface, each second computing resource including at least one of a processor or a memory.

(D11) In the method of any of D1-D10, further comprising: terminating the common computing unit and the plurality of applications based at least in part on a cumulative demand, which is a sum of the dynamic demands of the plurality of applications for the plurality of computing resources.

(E1) A first example computer program product (FIG. 11, 1118, 1122) comprising a computer-readable storage medium having instructions recorded thereon for enabling a processor-based system (FIG. 1, 102A-102M, 106A-106N; FIG. 3, 300; FIG. 11, 1100) to perform operations. The operations comprise running (FIG. 2, 202) a plurality of applications (FIG. 3, 324A-324N) of a plurality of customers of a multi-tenant software service in a common computing unit (FIG. 3, 320A), which is a virtual machine or a container, using one or more processes (FIG. 3, 322A) that are included in the common computing unit. The operations further comprise allocating (FIG. 2, 204) a plurality of computing resources (FIG. 3, 334A-334N) among the plurality of applications within the common computing unit based at least in part on dynamic demands of the plurality of applications for the plurality of computing resources and further based at least in part on a plurality of resource limits associated with the plurality of respective customers. Each computing resource includes at least one of a processor or a memory. Each resource limit indicates a maximum amount of the plurality of computing resources that is capable of being allocated to the respective customer. The operations further comprise dynamically re-allocating (FIG. 2, 206) the plurality of computing resources among the plurality of applications within the common computing unit, as a result of changing the resource limit of at least one customer, while maintaining at least one network connection (FIG. 3, 336A-336N) between a client device (FIG. 1, 102A-102M) of each customer of the plurality of customers and at least one respective application of the plurality of applications.

(F1) A second example computer program product (FIG. 11, 1118, 1122) comprising a computer-readable storage medium having instructions recorded thereon for enabling a processor-based system (FIG. 1, 102A-102M, 106A-106N; FIG. 5, 500; FIG. 11, 1100) to perform operations. The operations comprise running (FIG. 4, 402) a plurality of applications (FIG. 5, 524A-524N) of a plurality of customers of a multi-tenant software service in a common computing unit (FIG. 5, 520A), which is a virtual machine or a container, using one or more processes (FIG. 5, 522A) that are included in the common computing unit. The operations further comprise allocating (FIG. 4, 404) a plurality of computing resources (FIG. 5, 534A-534N) among the plurality of applications within the common computing unit based at least in part on dynamic demands of the plurality of applications for the plurality of computing resources and further based at least in part on a plurality of resource limits associated with the plurality of respective customers. Each computing resource includes at least one of a processor or a memory. Each resource limit indicates a maximum amount of the plurality of computing resources that is capable of being allocated to the respective customer. The operations further comprise dynamically re-allocating (FIG. 4, 406) the plurality of computing resources among the plurality of applications within the common computing unit, as a result of changing the resource limit of at least one customer, while maintaining at least one network connection between an interface, which is between a plurality of client devices of the plurality of customers and the plurality of applications, and a client device (FIG. 1, 102A-102M) of each customer of the plurality of customers.

IV. Example Computer System

FIG. 11 depicts an example computer 1100 in which embodiments may be implemented. Any one or more of the user devices 102A-102M and/or any one or more of the servers 106A-106N shown in FIG. 1, the computer system 300 shown in FIG. 3, and/or the computing system 500 shown in FIG. 5 may be implemented using computer 1100, including one or more features of computer 1100 and/or alternative features. Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments may be implemented in further types of computer systems, as would be known to persons skilled in the relevant art(s).

As shown in FIG. 11, computer 1100 includes a processing unit 1102, a system memory 1104, and a bus 1106 that couples various system components including system memory 1104 to processing unit 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic for implementing any one or more of (e.g., at least a portion of) the dynamic re-allocation logic 108, the dynamic re-allocation logic 308, the execution logic 312, the allocation logic 314, the limit change logic 316, the store 318, the plurality of computing units 320A-320N, the dynamic re-allocation logic 508, the execution logic 512, the allocation logic 514, the limit change logic 516, the store 518, the plurality of computing units 520A-520N, the interface 542, flowchart 200 (including any step of flowchart 200), and/or flowchart 400 (including any step of flowchart 400), as described herein.

A user may enter commands and information into the computer 1100 through input devices such as keyboard 1138 and pointing device 1140. Other input devices (not shown) may include a microphone, joystick, game pad, satellite dish, scanner, touch screen, camera, accelerometer, gyroscope, or the like. These and other input devices are often connected to the processing unit 1102 through a serial port interface 1142 that is coupled to bus 1106, but may be connected by other interfaces, such as a parallel port, game port, or a universal serial bus (USB).

A display device 1144 (e.g., a monitor) is also connected to bus 1106 via an interface, such as a video adapter 1146. In addition to display device 1144, computer 1100 may include other peripheral output devices (not shown) such as speakers and printers.

Computer 1100 is connected to a network 1148 (e.g., the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable storage medium" are used to generally refer to media (e.g., non-transitory media) such as the hard disk associated with hard disk drive 1114, removable magnetic disk 1118, removable optical disk 1122, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of the computer 1100.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
a processing system; and
a memory that stores computer-executable instructions that are executable by the processing system to at least:
allocate a first proportion of computing resources to an application in a computing unit, which is a virtual machine or a container, based at least on dynamic demand of the application for the computing resources and further based at least on a resource limit of a user, the resource limit indicating a maximum amount of the computing resources that is capable of being allocated to the user; and
dynamically allocate a second proportion of the computing resources, which is different from the first proportion, to the application in the computing unit, as a result of changing the resource limit of the user, while maintaining a network connection between a client device of the user and the application.

2. The system of claim 1, wherein the computer-executable instructions are executable by the processor system to at least:
dynamically allocate the second proportion of the computing resources to the application in the computing unit without causing another computing unit to run at least a portion of the application.

3. The system of claim 1, wherein the computer-executable instructions are executable by the processor system to at least:
maintain the network connection between the client device of the user and the application by maintaining an ability of the client device to use the application over the network connection from a time instance prior to initiating dynamic allocation of the second proportion of the computing resources to the application in the computing unit until a time instance after completion of the dynamic allocation of the second proportion of the computing resources to the application in the computing unit.

4. The system of claim 1, wherein the computer-executable instructions are executable by the processor system to at least:
dynamically allocate the second proportion of the computing resources to the application in the computing unit without restarting a process that is used to run the application and without ending the process that is used to run the application.

5. The system of claim 1, wherein the computing unit is the virtual machine; and
wherein the computer-executable instructions are executable by the processor system to at least:
dynamically allocate the second proportion of the computing resources to the application in the computing unit without utilizing a container orchestration system.

6. The system of claim 1, wherein the computer-executable instructions are executable by the processor system to at least:
dynamically allocate the second proportion of the computing resources to the application in the computing unit based at least on the dynamic demand of the application for the computing resources and further based at least on the changed resource limit of the user.

7. The system of claim 1, wherein the computer-executable instructions are executable by the processor system further to at least:
dynamically launch a second computing unit, including a second application, based at least on a cumulative demand, which is a sum of dynamic demands of applications that run in the computing unit for the computing resources, and further based at least on the resource limit of the user; and
allocate a proportion of a second computing resource to the second application in the second computing unit, based at least on dynamic demand of the second application for the second computing resource and further based at least on the resource limit of the user.

8. The system of claim 1, wherein the computer-executable instructions are executable by the processor system to at least:
allocate the proportion of the second computing resource to the second application in the second computing unit while maintaining the network connection between the client device of the user and the application that runs in the computing unit.

9. The system of claim 1, wherein the computer-executable instructions are executable by the processor system further to at least:
dynamically launch a second computing unit, including a second application of the user, based at least on the dynamic demand of the application for the computing resources and further based at least on the resource limit of the user; and allocate a proportion of second computing resources, which are not included in the computing resources, across the application and the second application based at least on dynamic demand of the application for the second computing resources, dynamic demand of the second application for the second computing resources, and the resource limit of the user while maintaining the network connection between the client device of the user and the application that runs in the computing unit.

10. The system of claim 1, wherein the computer-executable instructions are executable by the processor system further to at least:

terminate the computing unit and the application based at least on a cumulative demand, which is a sum of dynamic demands of applications that run in the computing unit for the computing resources.

11. A method, which is implemented by a computing system, comprising:

allocating a first proportion of computing resources to an application in a computing unit, which is a virtual machine or a container, based at least on dynamic demand of the application for the computing resources and further based at least on a resource limit of a user, the resource limit indicating a maximum amount of the computing resources that is capable of being allocated to the user; and dynamically allocating a second proportion of the computing resources, which is different from the first proportion, to the application in the computing unit, as a result of changing the resource limit of the user, while maintaining a network connection between an interface, which is between a client device of the user and the application, and the client device of the user.

12. The method of claim 11, wherein dynamically allocating the second proportion of the computing resources to the application comprises:

dynamically allocating the second proportion of the computing resources to the application in the computing unit without causing another computing unit to run at least a portion of the application.

13. The method of claim 11, wherein maintaining the network connection between the interface and the client device of the user comprises:

maintaining an ability of the client device to use the application over the network connection from a time instance prior to initiating dynamic allocation of the second proportion of the computing resources to the application in the computing unit until a time instance after completion of the dynamic allocation of the second proportion of the computing resources to the application in the computing unit.

14. The method of claim 11, further comprising:

while maintaining the network connection between the client device of the user and the interface, perform the following operations:

determining that a connection between the interface and the application is disconnected; and automatically re-connecting the connection between the interface and the application based at least on a determination that the connection is disconnected.

15. The method of claim 14, wherein determining that the connection between the interface and the application is disconnected comprises:

determining that the connection between the interface and the application is disconnected as a result of operation of the computing unit being disrupted;

wherein the method further comprises:

automatically relaunching the computing unit based at least on the operation of the computing unit being disrupted; and wherein automatically re-connecting the connection between the interface and the application is further based at least on the computing unit being automatically relaunched.

16. The method of claim 11, wherein dynamically allocating the second proportion of the computing resources to the application comprises:

dynamically allocating the second proportion of the computing resources to the application in the computing unit based at least on the dynamic demand of the application for the computing resources and further based at least on the changed resource limit of the user.

17. The method of claim 11, further comprising:

dynamically launching a second computing unit, including a second application, based at least on a cumulative demand, which is a sum of dynamic demands of applications that run in the computing unit for the computing resources, and further based at least on the resource limit of the user; and allocating a proportion of a second computing resource to the second application in the second computing unit, based at least on dynamic demand of the second application for the second computing resource and further based at least on the resource limit of the user.

18. The method of claim 17, wherein allocating the proportion of the second computing resource to the second application comprises:

allocating the proportion of the second computing resource to the second application in the second computing unit while maintaining the network connection between the client device of the user and the interface.

19. The method of claim 11, further comprising:

dynamically launching a second computing unit, including a second application of the user, based at least on the dynamic demand of the application for the computing resources and further based at least on the resource limit of the user; and allocating a proportion of second computing resources, which are not included in the computing resources, across the application and the second application based at least on dynamic demand of the application for the second computing resources, dynamic demand of the second application for the second computing resources, and the resource limit of the user while maintaining the network connection between the client device of the user and the interface.

20. A computer program product comprising a computer-readable storage medium having instructions recorded thereon for enabling a processor-based system to perform operations, the operations comprising:

allocating a first proportion of computing resources to an application in a computing unit, which is a virtual machine or a container, based at least on dynamic demand of the application for the computing resources and further based at least on a resource limit of a user, the resource limit indicating a maximum amount of the computing resources that is capable of being allocated to the user; and allocating a second proportion of the computing resources, which is different from the first proportion, to the application in the computing unit in real-time, as a result of changing the resource limit of the user, while maintaining a network connection between an interface, which is between a client device of the user and the application, and the client device of the user.

* * * * *